(12) United States Patent
Hara

(10) Patent No.: US 8,792,140 B2
(45) Date of Patent: Jul. 29, 2014

(54) IMAGE INFORMATION PROCESSING METHOD, IMAGE INFORMATION PROCESSING APPARATUS, IMAGE PROCESSING APPARATUS, AND RECORDING MEDIUM

(75) Inventor: Takayuki Hara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 92 days.

(21) Appl. No.: 13/509,145

(22) PCT Filed: Nov. 26, 2010

(86) PCT No.: PCT/JP2010/071627
§ 371 (c)(1),
(2), (4) Date: May 10, 2012

(87) PCT Pub. No.: WO2011/068179
PCT Pub. Date: Jun. 9, 2011

(65) Prior Publication Data
US 2012/0229829 A1    Sep. 13, 2012

(30) Foreign Application Priority Data

Dec. 1, 2009  (JP) .................................. 2009-273507
Mar. 16, 2010 (JP) .................................. 2010-059123

(51) Int. Cl.
*H04N 1/40* (2006.01)
(52) U.S. Cl.
USPC ............................ 358/3.26; 358/406; 358/504
(58) Field of Classification Search
USPC .......... 358/1.9, 2.1, 3.26, 400, 406, 500, 504, 358/515–521, 527
See application file for complete search history.

(56) References Cited

U.S. PATENT DOCUMENTS

| | | |
|---|---|---|
| 5,136,372 A | 8/1992 | Nakatani et al. |
| 6,698,355 B2 | 3/2004 | Fukui |
| 7,202,973 B2 | 4/2007 | Yamamoto et al. |
| 7,460,702 B2 | 12/2008 | Hamahashi et al. |
| 7,773,776 B2 | 8/2010 | Adachi |

(Continued)

FOREIGN PATENT DOCUMENTS

| | | |
|---|---|---|
| JP | 07-093543 A | 4/1995 |
| JP | 2000-251076 A | 9/2000 |

(Continued)

OTHER PUBLICATIONS

Extended European Search Report dated Jul. 30, 2012.

(Continued)

*Primary Examiner* — Thomas D Lee
*Assistant Examiner* — Stephen M Brinich
(74) *Attorney, Agent, or Firm* — Harness, Dickey & Pierce, P.L.C.

(57) ABSTRACT

Disclosed is an image information processing apparatus that determines, based on image information, a region suitable for inspecting image forming performance of an image forming apparatus in an entire region of an image represented by the image information. The image information processing apparatus includes a segment region extraction unit that extracts a segment region having a predetermined size from the entire region of the image; a color reproducibility prediction unit that predicts a result of color reproducibility of the entire image by using an algorithm in a case where the image forming performance is adjusted based on a color measurement result of the extracted segment region; and an object region determination unit that determines, as an object region, the segment region showing a best one of the plural results obtained by repeatedly performing extraction processing by the segment region extraction unit and prediction processing by the color reproducibility prediction unit.

6 Claims, 19 Drawing Sheets

(56) References Cited

U.S. PATENT DOCUMENTS

| | | |
|---|---|---|
| 2005/0094170 A1 | 5/2005 | Ichitani |
| 2006/0170996 A1 | 8/2006 | Headley et al. |
| 2007/0183659 A1 | 8/2007 | Itagaki et al. |
| 2009/0009766 A1 | 1/2009 | Bonino et al. |
| 2009/0021794 A1 | 1/2009 | Hara et al. |
| 2010/0296139 A1 | 11/2010 | Nishida |

FOREIGN PATENT DOCUMENTS

| | | |
|---|---|---|
| JP | 2001-219540 A | 8/2001 |
| JP | 3247142 B2 | 1/2002 |
| JP | 2002-185805 A | 6/2002 |
| JP | 2003-244440 A | 8/2003 |
| JP | 2003-311933 A | 11/2003 |
| JP | 3860540 B2 | 12/2006 |
| JP | 3941932 B2 | 7/2007 |
| JP | 2007-208940 A | 8/2007 |
| JP | 2007-208941 A | 8/2007 |
| JP | 2008-092288 A | 4/2008 |
| JP | 2008-528341 A | 7/2008 |
| JP | 4137890 A | 8/2008 |
| JP | 2008-238543 A | 10/2008 |
| JP | 2008-284790 A | 11/2008 |
| JP | 2009-044726 A | 2/2009 |
| JP | 2011-059532 A | 3/2011 |

OTHER PUBLICATIONS

International Search Report.
Written Opinion of the International Searching Authority.
Canadian Office Action mailed Jun. 7, 2013.

SPATIAL DISPERSION DEGREE $= -(1/d_{12}+1/d_{13}+1/d_{14}+1/d_{21}+1/d_{23}+1/d_{34})$

IMAGE INFORMATION PROCESSING METHOD, IMAGE INFORMATION PROCESSING APPARATUS, IMAGE PROCESSING APPARATUS, AND RECORDING MEDIUM

TECHNICAL FIELD

The present invention relates to an image processing method, an image information processing apparatus, and an image processing apparatus that determine an object region for evaluating image quality in the entire region of an image. Further, the present invention also relates to a recording medium having recorded therein a program that implements the image processing method so as to be readable by a machine.

BACKGROUND ART

Up until now, the image forming performance of an image forming apparatus is evaluated in such a manner as to compare differences between the colors of an image output from the image forming apparatus such as a printer and the colors of original image information. Generally, the image forming performance is evaluated according to the following method. In other words, a chart image for color evaluation is first output using prepared image information and then read by a scanner to obtain output image information. After that, in regard to the colors of respective parts in the chart image, differences between the colors expressed by the original image information and the colors expressed by the output image information are calculated to thereby evaluate the image forming performance.

In recent years, however, demand for outputting photographic images or the like has been increasing. Therefore, according to such an evaluation method, the above-described chart image for color evaluation has to be output onto an expensive gloss photo paper, which results in an increase in cost. Further, in the case of outputting the same images in large amounts, the likelihood of obtaining a good result would be high by using the colors of an image to be actually output as objects to be inspected rather using than a chart image for color evaluation including only limited colors. Therefore, there have been demanded techniques for evaluating image forming performance using an image freely output by the user instead of a chart image for color evaluation.

In order to evaluate image forming performance using an image freely output by a user, a technique for extracting an object region suitable for color evaluation from the entire region of the image is necessary. As such, a region extraction method disclosed in Patent Document 1 is known. According to this region extraction method, a small segment region including a target pixel is first extracted from the entire region of an original image based on image information, and then an entropy value indicating evenness (uniformity) in density between respective pixels in the small segment region is calculated based on the pixel values of the respective pixels in the small segment region. After repeatedly performing the processing of extracting small segment regions and calculating entropy values thereof while sequentially shifting target pixels, the small segment region in which density between the respective pixels is even is specified from the entire region of the image based on the entropy values of the respective small segment regions. The region in which the density between the respective pixels is even is suitable for evaluating an output color because it has less color variations. That is, with the application of the region extraction method disclosed in Patent Document 1, it is possible to extract an object region suitable for color evaluation from the entire region of an original image provided by the user.

However, even if an object region suitable for color evaluation can be extracted, the adjustment of image forming performance excellent in color reproducibility is not always made possible. Specifically, a general image forming apparatus has at least a characteristic in which the reproducibility of one color is degraded as it adjusts image forming performance so as to faithfully reproduce another color. Thus, even if an object region suitable for color evaluation is extracted by the application of the region extraction method disclosed in Patent Document 1, when image forming performance is adjusted to bring its output color in close to an original color based on the measurement result of an actual output color of the object region, the color reproducibility of other regions is greatly degraded. Accordingly, the color reproducibility of an image could be rather degraded as a whole.

Further, image forming performance cannot be accurately evaluated only by the extraction of region in which a difference in density is even. In order to accurately evaluate image forming performance, it is requested that the regions have a color tone close to a color material (color purity is high) and are adequately dispersed in the entire region of an image (spatial dispersion degree is high), besides the evenness of a difference in density (evenness degree is high). Specifically, in the image forming apparatus that outputs color images, at least three different color materials, such as Y (yellow), M (magenta), and C (cyan), are used as the color materials of ink and toner. The image forming apparatus reproduces various color tones by appropriately mixing such monochromatic color materials together on a paper or adjusting an area ratio of single-color dots composed of only the respective color materials. In order to accurately evaluate color reproducibility in such a configuration, it is necessary to select, as object regions, regions having color tones close to the color materials in such a manner that single-color regions close in color tone to Y, M, and C are selected as the regions to be detected. Further, the image forming apparatus is likely to show different color reproducibility depending on the position of an image; the color reproducibility is different between the upper side and the lower side of a paper even with the same color. Thus, it is insufficient to specify only one region from the entire region of an image as an object region for the respective single colors such as Y, M, and C, but is necessary to specify plural regions appropriately dispersed in the image as object regions. Accordingly, with respect to the respective single colors, it is necessary to specify plural combinations of segment regions showing a relatively high evenness degree and color purity in which the spatial dispersion degrees of the segment regions are relatively high from the entire region of the image.

In order to specify combinations of such segment regions, the present inventor has conceived the following method. In other words, the processing of extracting segment regions having a predetermined size from the entire region of an image and then calculating the evenness degree and the color purity of the segment regions is repeatedly performed until the entire image is covered. Next, all possible combinations established when a predetermined number of the segment regions are selected from all segment regions and combined with each other are specified. Then, the evenness degree, the color purity, and the linear sum of the spatial dispersion degree of the respective segment regions are calculated for the respective combinations and regarded as index values. Here, one of the combinations showing the largest index value is specified as an object region for inspecting an output color.

However, it turns out that this method is not practical because it requires an enormous processing time for calculating the above-described linear sum for the possible combinations established when the predetermined number of the segment regions are selected from all the segment regions and combined with each other.

Patent Document 1: JP-B-3860540

DISCLOSURE OF INVENTION

The present invention has been made in view of the above circumstances and may have an object of providing an image processing method, an image processing apparatus, and a non-transitory recording medium having recorded therein a program. In other words, the present invention may provide the image processing method and the like capable of specifying a combination of segment regions having a relatively high evenness degree, color purity, and a spatial dispersion degree from the entire region of an image in a shorter period of time.

In addition, the present invention may have another object of providing an image information processing method and the like capable of selecting an object region suitable for improving the color reproducibility of an entire image.

According to an aspect of the present invention, there is provided an image information processing apparatus that determines, based on image information, a region suitable for inspecting image forming performance of an image forming apparatus in an entire region of an image represented by the image information. The image information processing apparatus includes a segment region extraction unit that extracts a segment region having a predetermined size from the entire region of the image; a color reproducibility prediction unit that predicts a result of color reproducibility of the entire image by using an algorithm in a case where the image forming performance of the image forming apparatus is adjusted based on a color measurement result of the extracted segment region; and an object region determination unit that determines, as an object region, the segment region showing a best one of the plural results obtained by repeatedly performing extraction processing by the segment region extraction unit and prediction processing by the color reproducibility prediction unit.

BEST MODE FOR CARRYING OUT THE INVENTION

Next, a description is made of an image information processing apparatus according to a first mode of the present invention.

Figure 1:
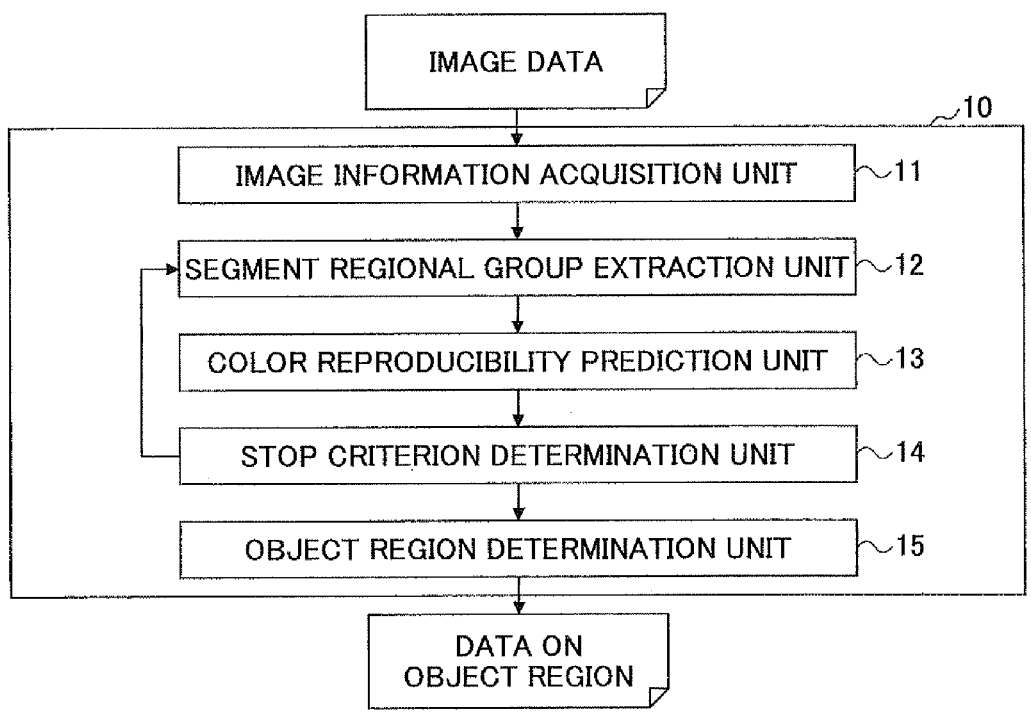
FIG. 1 is a block diagram showing the configuration of a substantial part of an image information processing apparatus according to a first mode of the present invention.

FIG. 1 is a block diagram showing the configuration of a substantial part of an image information processing apparatus 10 according to the first mode of the present invention. As shown in FIG. 1, the image information processing apparatus 10 has an image information acquisition unit 11, a segment regional group extraction unit 12, a color reproducibility prediction unit 13, a stop criterion determination unit 14, an object region determination unit 15, and the like.

The image information acquisition unit 11 of the image information processing apparatus 10 acquires image data transmitted from a user via a personal computer or the like. The image data include pixel values expressing the brightness of single-color components of C (cyan), M (magenta), Y (yellow), and K (black) for each of plural pixels constituting an image and arranged in matrix pattern, and are original image data output from the personal computer or the like to a printer. The image information processing apparatus 10 determines which region is specified as an object for color inspection from the entire region of the image data. After the determination by the image information processing apparatus 10, when scanned image data obtained by scanning an output image are input to the image information processing apparatus 10, the image information processing apparatus 10 specifies the object region in the output image based on the matrix position of the respective pixels and compares the color data of the object region with its original color data, thereby evaluating an output color.

Prior to determining an object region for color inspection in original image data, the image information processing apparatus 10 first determines the combinations of segment regions suitable for color inspection from the entire region of the image data for each of the four colors C, M, Y, and K.

Figure 2:
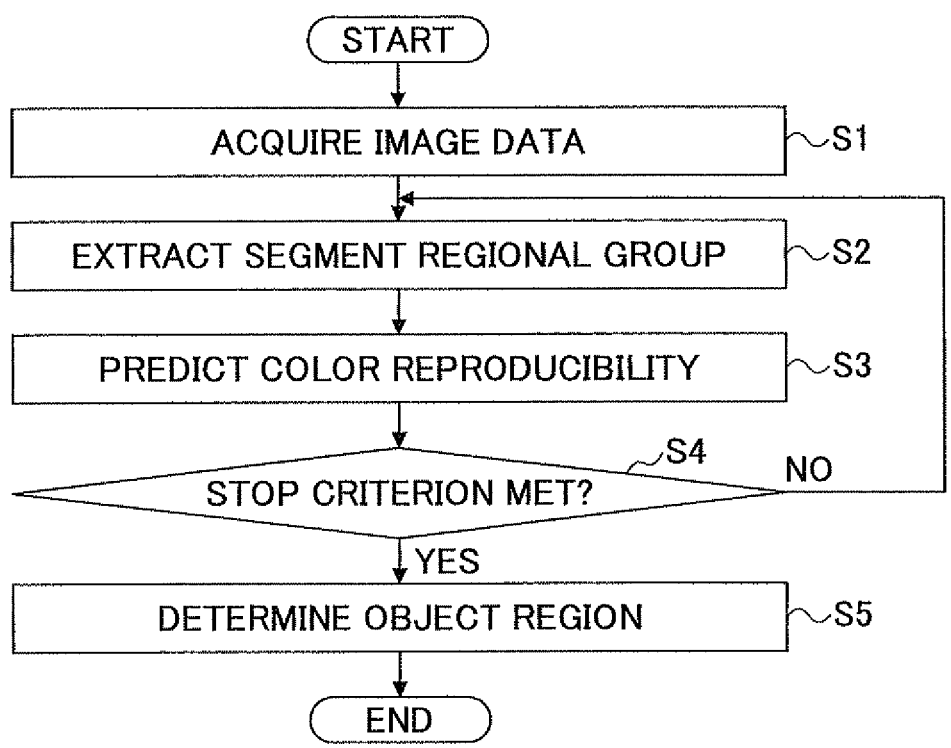
FIG. 2 is a flowchart showing the processing flow of determining an object region by the image information processing apparatus.

FIG. 2 is a flowchart showing the processing flow of determining an object region by the image information processing apparatus 10. The image information processing apparatus 10 first acquires image data by using the image information acquisition unit 11 (step 1: step is hereinafter represented as S). Then, the segment regional group extraction unit 12 repeatedly performs steps S2 through S4. Specifically, assuming that a pixel placed at a predetermined position of a pixel matrix expressed by the image data is set as a subject pixel, N-pieces of rectangular regions (0.1 through 1.0 mm square) about the subject pixel are randomly extracted (S2). As shown in FIG. 1, this extraction processing is performed by the segment regional group extraction unit 12.

After the extraction of the plural segment regions by the segment regional group extraction unit 12, the color reproducibility prediction unit 13 individually predicts a result of color reproducibility as an entire image when it is assumed that image forming performance is adjusted to correspond to colors for each of the plural segment regions (S3). The prediction processing is performed based on a previously-stored algorithm. The algorithm is structured as follows. In other words, the characteristics of the image forming apparatus to be inspected are previously examined. Specifically, a dedicated chart image is output by the image forming apparatus and scanned by a scanner to measure respective colors. Next, any of the plural colors is selected. Here, if the color measurement result shows that the color is different from its original color, the image forming performance of the image forming apparatus is adjusted to restore the color to the original color. Then, after another chart image is output by the image forming apparatus and scanned by the scanner, differences between the previous color measurement result and the current color measurement result are calculated for all the colors other than the previously selected one. Differences of the other colors when the image forming performance is adjusted to correspond to all the colors reproduced by the image forming apparatus are similarly measured. Since a difference amount between the measured color and the original color varies depending on an environment or the like, the measurement is repeatedly performed to calculate an average value of the difference amounts for all the colors. Then, based on the average values, the above-described algorithm is structured. The following formula (1) shows an example of the algorithm thus obtained.

$$e_{color}(w|z_i) = a//w - z_i//^2 + b \qquad \text{Formula (1)}$$

In the formula (1), a left side expresses the prediction value of the result of color reproducibility at any position in an entire image. Further, "w" expresses a color (i.e., color represented by a pixel value) at any position in the entire image. Further, $z_i$ expresses the color (i.e., color represented by a pixel value) of the i-th segment region among the N-pieces of segment regions extracted by the segment regional group extraction unit 12. Further, "a" and "b" each express a constant. Further, "//" is the symbol of a norm, and the inside of the norm expresses a Euclidean distance between w and $z_i$ in a four-dimensional color space using yellow (Y), magenta (M), cyan (C), and black (K) as axes.

According to the formula (1), it is possible to predict a result of color reproducibility at any position in the entire image when the image forming performance is adjusted to correspond to the color of the i-th segment region. The color reproducibility prediction unit 13 first sets 1 to i (i=1), and then calculates $e_{color}(w|z_i)$ with respect to the first segment region. Next, the color reproducibility prediction unit 13 sets 2 to i (i=2), and then calculates $e_{color}(w|z_i)$ in the same manner. The color reproducibility prediction unit 13 repeatedly performs this processing until N is set to i ($z_{i=N}$). Thus, after the calculation of $e_{color}(w|z_{i=1})$ through $e_{color}(w|z_{i=N})$ an average value of the calculated results of color reproducibility or the best value thereof is obtained as the prediction value of color reproducibility of the color w when the image forming performance is adjusted to correspond to the first through N-th segment regions. With respect to the position w, the leftmost position in the entire image is selected, and a color at the position is specified as w and substituted into the formula (1) to thereby calculate the prediction value. Then, the position is shifted by one in a right direction, and a color at the position is specified as w and substituted into the formula (1) to thereby calculate the prediction value. The processing of shifting the position and substituting the color into the formula (1) to thereby calculate the prediction value is repeatedly performed until all the positions of the entire image are covered. Then, an average value of the calculated results or the best value thereof is obtained as the prediction value of color reproducibility as the entire image. This prediction value is regarded as the result of color reproducibility of the entire image when the image forming performance is adjusted to correspond to the first through N-th segment regions.

After the color reproducibility prediction unit 13 calculates the result of color reproducibility with respect to the first through N-th segment regions extracted by the segment regional group extraction unit 12, the stop criterion determination unit 14 determines whether a predetermined stop criterion is met (S4). An example of such a predetermined stop criterion may be such that the combination of steps S2 and S3 is repeatedly performed predetermined times. Alternatively, another predetermined stop criterion may be such that a result obtained by calculating color reproducibility of the entire image is not continuously improved predetermined times. When the stop criterion is not met, the stop criterion determination unit 14 transmits a reprocessing execution signal to the segment regional group extraction unit 12. Thus, steps S2 and S3 are performed again. On the other hand, when the stop criterion is met, the stop criterion determination unit 14 outputs a determination processing execution signal to the object region determination unit 15. Then, the object region determination unit 15 determines as an object region the segment regional group showing the best one of the results obtained by repeatedly performing step S3 (S5), and outputs the data of the segment regional group to the next step.

As described above, the image information processing apparatus 10 according to the first mode of the present invention predicts a result of color reproducibility of an entire image when it is assumed that the image forming performance of the image forming apparatus is adjusted based on a color measurement result of a segment region extracted from the entire image. Then, the image information processing apparatus 10 determines as an object region a segment regional group showing the best one of the results obtained by repeatedly performing this prediction processing for plural segment regional groups, thereby making it possible to select the object region suitable for improving color reproducibility of the entire image.

Note that the formula (1) is just an example of the algorithm for predicting a result of color reproducibility of an entire image, but the algorithm according to the first mode of the present invention is not limited to the formula (1). For example, it may be an algorithm in a data table system or a function formula different from the formula (1).

The image information processing apparatus 10 according to the first mode of the present invention is composed of a personal computer and a program for causing the personal computer to function as an image information processing apparatus. The program is stored in an optical disk such as a CD-ROM and a DVD-ROM as a recording medium so as to be readable by a machine, and can be installed in the hard disk of the personal computer via the optical disk. Any of the image information acquisition unit 11, the segment regional group extraction unit 12, the color reproducibility prediction unit 13, the stop criterion determination unit 14, and the object region determination unit 15 shown in FIG. 1 is implemented by the arithmetic processing of the CPU of a personal computer as software.

Next, descriptions are made of respective embodiments and modifications in which a more characteristic configuration is added to the image information processing apparatus 10 according to the first mode of the present invention. Note that unless otherwise specified, the configuration of the image information processing apparatus 10 according to the respective embodiments and modifications is the same as the configuration of the image information processing apparatus 10 according to the first mode of the present invention.

First Embodiment

The segment regional group extraction unit 12 of the image information processing apparatus 10 according to a first embodiment is configured to extract a segment region larger than the segment region extracted by the image information processing apparatus 10 according to the first mode of the present invention. The size of each segment region is more than a square of 1.0 mm side. Selecting a relatively large segment region makes it possible to allow for positional shifts and noise at color measurement. On the other hand, an output image is susceptible to texture. Since the accurate prediction of color reproducibility becomes difficult under the presence of texture, it is necessary to select an even region as a segment region from an output image.

Figure 3:
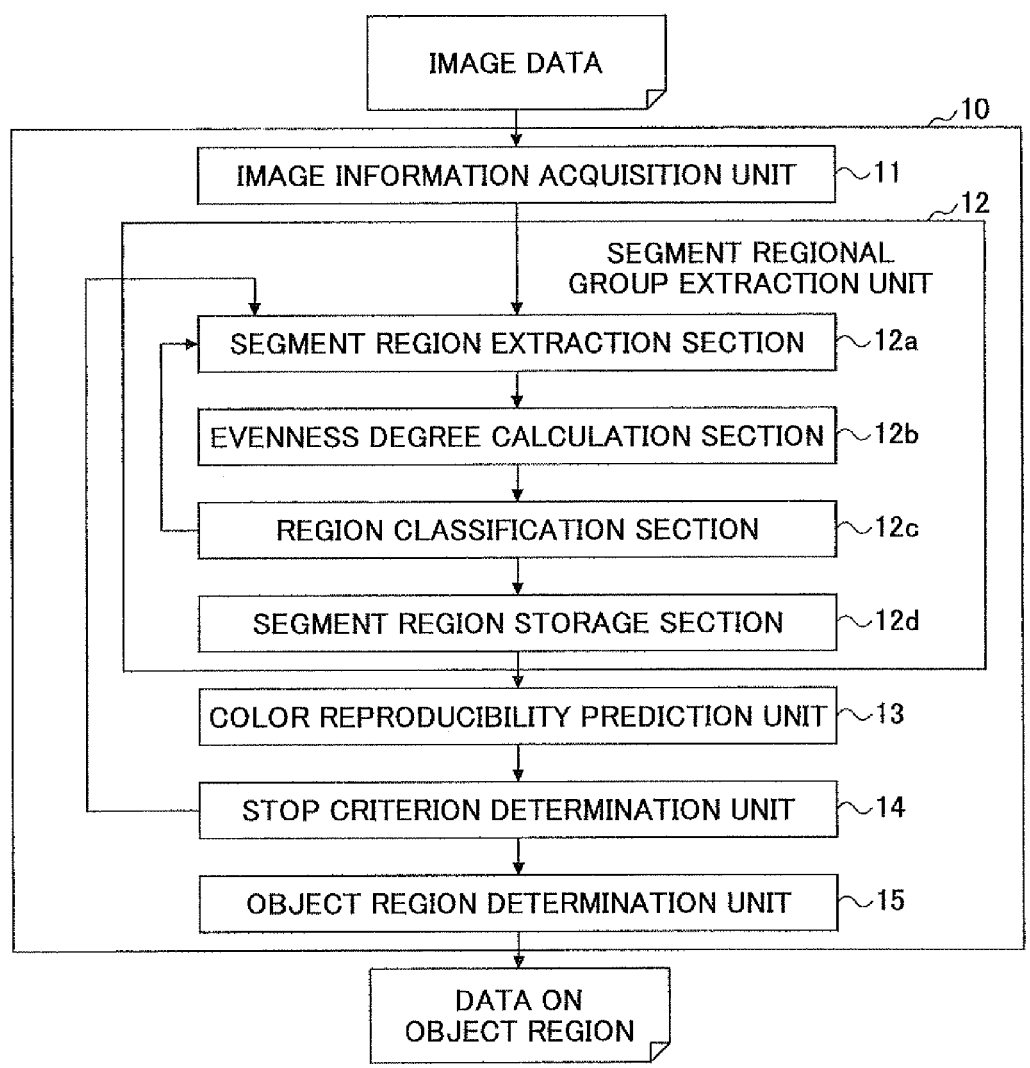
FIG. 3 is a block diagram showing the configuration of a substantial part of the image information processing apparatus according to a first embodiment.

FIG. 3 is a block diagram showing the configuration of a substantial part of the image information processing apparatus 10 according to the first embodiment. In FIG. 3, the segment regional group extraction unit 12 has a segment region extraction section 12a, an evenness degree calculation section 12b, a region classification section 12c, and a segment region storage section 12d.

Figure 4:
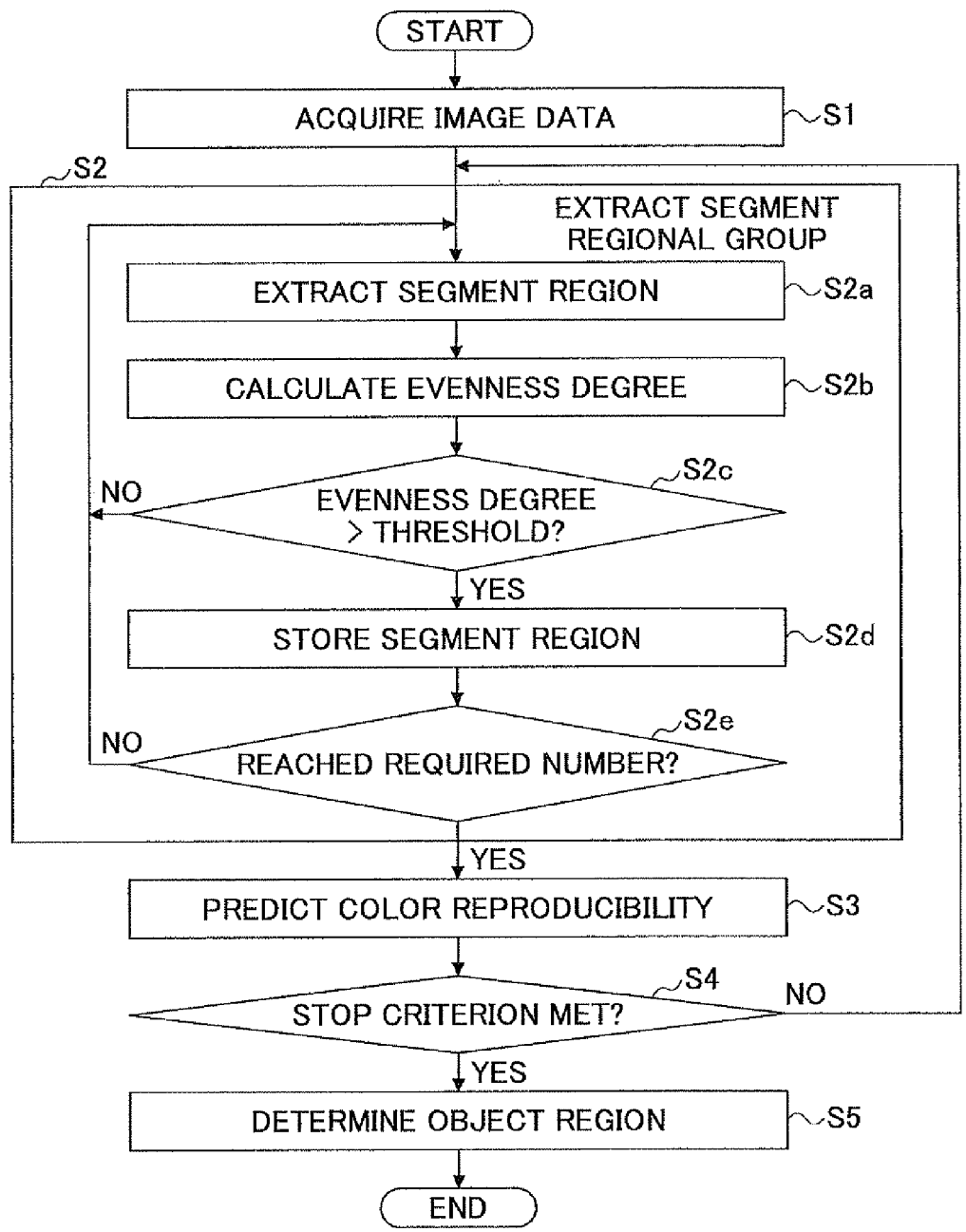
FIG. 4 is a flowchart showing the processing flow of object region determination processing by the image information processing apparatus according to the first embodiment.

FIG. 4 is a flowchart showing the processing flow of object region determination processing by the image information processing apparatus 10 according to the first embodiment. Since steps S1 and S3 through S5 shown in FIG. 4 are the same as those shown in FIG. 2, their descriptions are omitted here. The processing of segment regional group extraction in S2 has five steps of a segment region extraction step (S2a), an evenness degree calculation step (S2b), a classification step based on an evenness degree (S2c), a segment region storage step (S2d), and a region number determination step (S2e).

The segment region extraction step (S2a) is performed by the segment region extraction section 12a. The segment region extraction section 12a randomly extracts a segment region from the entire region of an image.

After the extraction of the segment region by the segment region extraction section 12a, the evenness degree calculation section 12b calculates an evenness degree showing density evenness of the entirety of the segment region while referring to the pixel values of respective pixels (colors C, M, Y, and K) in the extracted segment region (S2b). The evenness degree may be calculated according to various methods. As a first example, the evenness degree may be calculated as follows. In other words, the dispersion of the respective pixels of the colors C, M, Y, and K is first calculated. Then, the sum of the dispersion with a negative sign is regarded as the evenness degree of the segment region.

As a second example, the evenness degree may be calculated according to the determinant of a variance-covariance matrix. Specifically, the variance and covariance of the respective pixels in the segment region are calculated for each of the colors C, M, Y, and K. Then, a 4×4 variance-covariance matrix in which the variance is arranged in diagonal components and the covariance is arranged in non-diagonal components is structured, and the determinant of the matrix is calculated. The value of the determinant with a negative sign may be regarded as the evenness degree. This is because the distribution of the respective pixels in a CMYK space can be evaluated with the determinant of the variance-covariance matrix. The second example is superior to the first example in that it can evaluate the spread of the colors between difference components.

Moreover, as a third example, the evenness degree may be calculated according to the frequency characteristics of the colors. Specifically, Fourier transform is performed using the respective pixels in a segment region, and the square sum of the absolute value of a Fourier coefficient of a specific frequency is calculated. The sum with a negative sign is regarded as the evenness degree. The specific frequency may include plural frequencies. According to the evenness degree of the first example, an image subjected to halftone processing is influenced by the pattern of halftone processing. Therefore, an even region may not be detected. As opposed to this, according to the evenness degree of the third example, the square sum of the absolute value of a Fourier coefficient of a specific frequency is used. Therefore, the evenness degree free from the influence by halftone processing can be calculated.

The calculation of the evenness degree calculated in step S2b is not limited to the first through third examples described above, but known evenness degree calculation techniques are available.

After the calculation of the evenness degree in the segment region by the evenness degree extraction section 12a, the region classification section 12c determines whether the segment region should be included in a segment regional group based on whether the evenness degree exceeds a predetermined threshold. Specifically, if the evenness degree does not exceed the threshold, the region classification section 12c determines that the segment region should not be included in the segment regional group and then outputs a signal for extracting a segment region again to the segment region extraction section 12a. Thus, a new segment region is extracted by the segment region extraction section 12a, and steps S2b and S2c are repeatedly performed. On the other hand, if the evenness degree exceeds the threshold, the region classification section 12c determines that the segment region should be included in the segment regional group and then causes the segment region storage section 12d to store the segment region. Then, the region classification section 12c determines whether the number of the segment regions stored in the segment region storage section 12d has reached a predetermined number necessary for the segment regional group. If the number has not reached the predetermined number, the region classification section 12c outputs the signal for extracting a segment region again to the segment region extraction section 12a. Thus, a new segment region is extracted by the segment region extraction section 12a, and steps S2b and S2c are repeatedly performed. On the other hand, if the number has reached the predetermined number, the region classification section 12c outputs to the segment region storage section 12d a signal for outputting the data of the segment regional group to the next step. Thus, the data of the segment regional group are output from the segment region storage section 12d, and the segment regional group extraction step (S12) is completed.

Second Embodiment

The image information processing apparatus 10 according to a second embodiment has the following characteristic configuration in addition to the characteristic configuration of the image information processing apparatus 10 according to the first embodiment. In other words, the image information processing apparatus 10 according to the second embodiment stores, as a retention solution, information on a segment regional group showing the best result among plural segment regional groups for which a result of color reproducibility is calculated. Then, in the segment regional group extraction step, the image information processing apparatus 10 extracts a new segment region based on a segment regional group stored as the retention solution so as to extract the segment region before its evenness degree is calculated. More specifically, the image information processing apparatus 10 extracts a new segment region such that at least one of segment regions of a newly-structured segment regional group is the same or close to the segment region of the retention solution. According to such extraction, the segment regional group of the segment region close to the segment region of the retention solution showing the best result is extracted. Thus, it is possible to enhance the likelihood of extracting a segment regional group showing a further excellent result.

Figure 5:
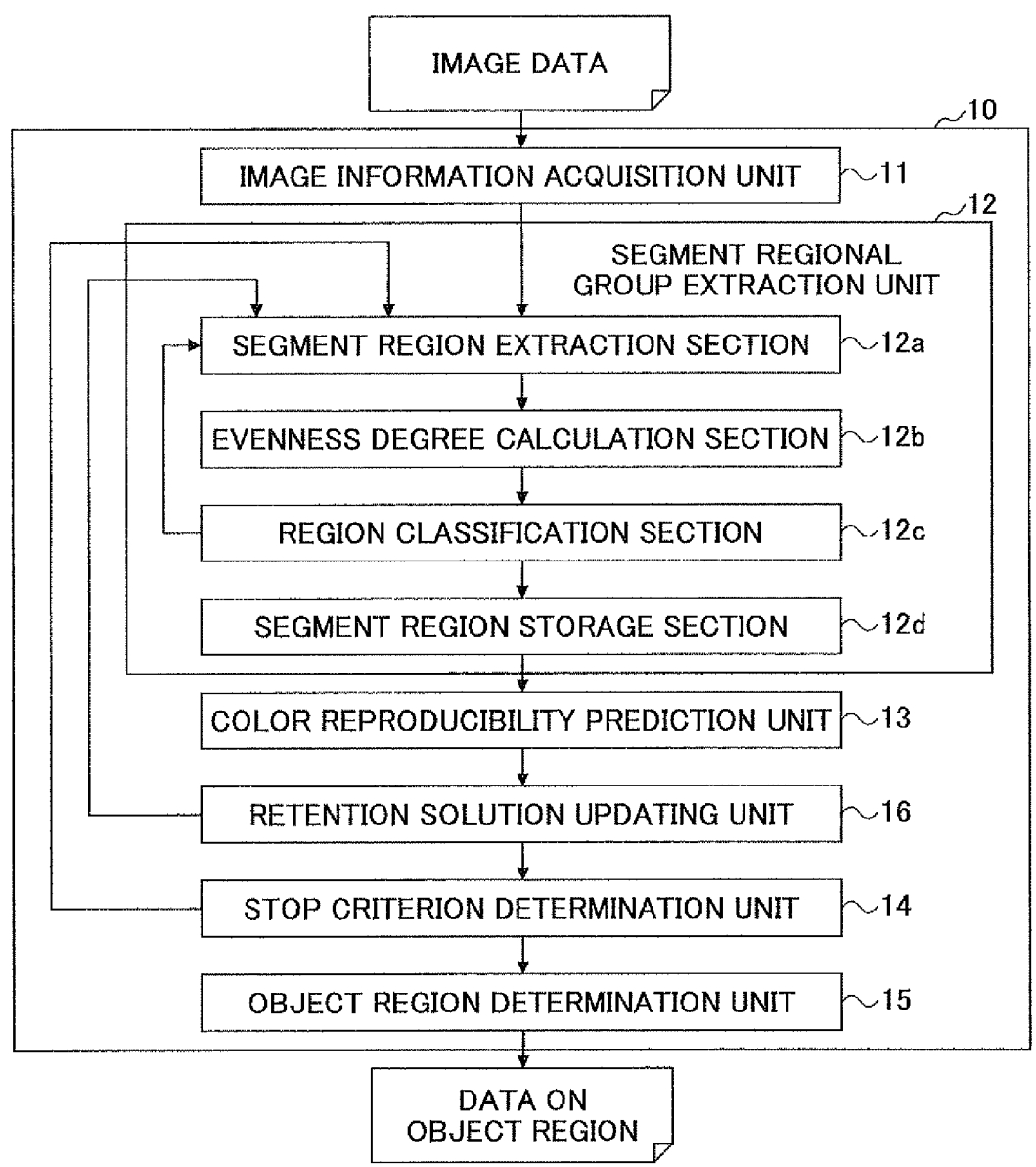
FIG. 5 is a block diagram showing the configuration of a substantial part of the image information processing apparatus according to a second embodiment.

FIG. 5 is a block diagram showing the configuration of a substantial part of the image information processing apparatus 10 according to the second embodiment. The image information processing apparatus 10 according to the second embodiment is different from the image information processing apparatus 10 according to the first embodiment in that it has a retention solution updating section 16.

Figure 6:
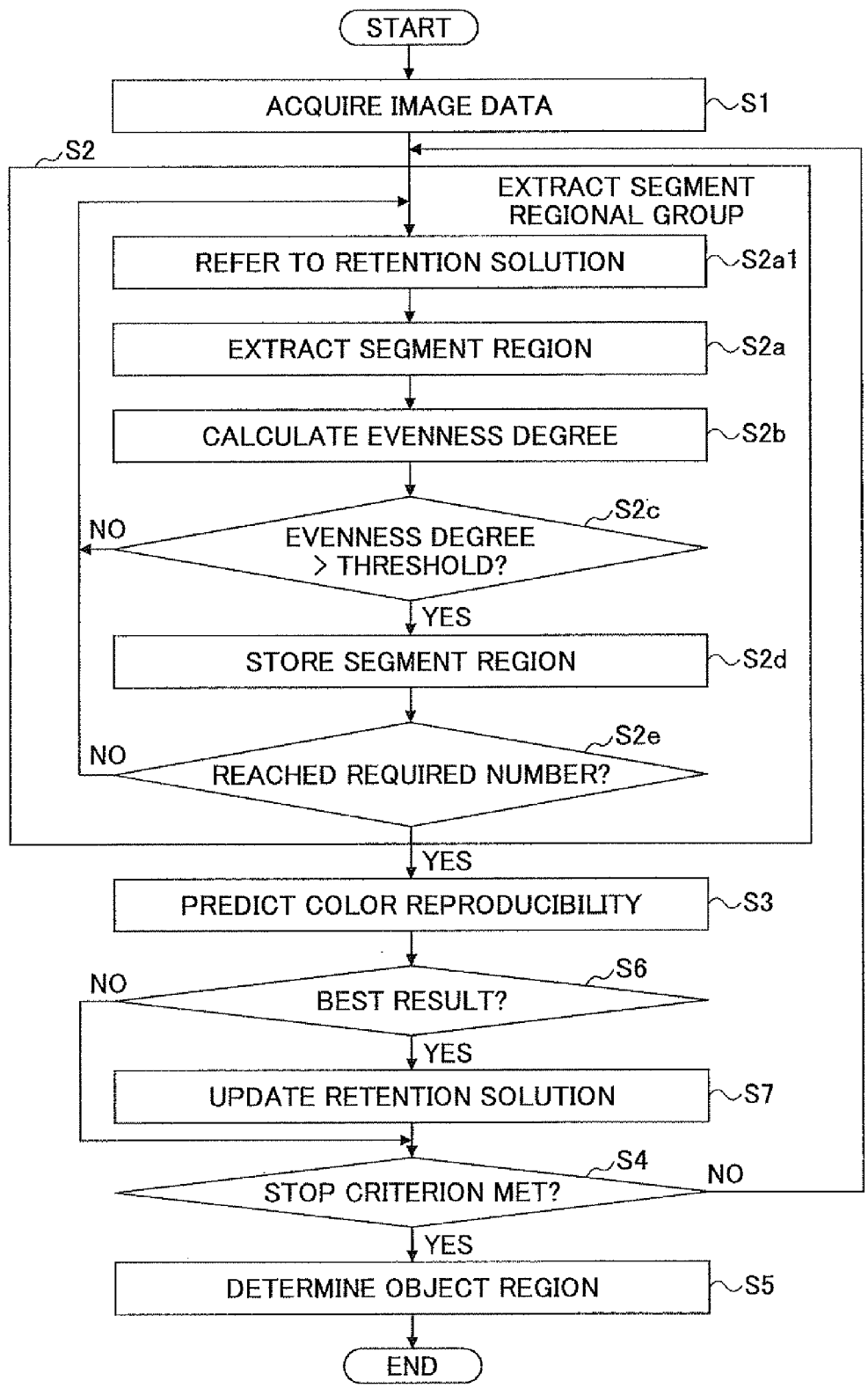
FIG. 6 is a flowchart showing the processing flow of object region determination processing by the image information processing apparatus according to the second embodiment.

FIG. 6 is a flowchart showing the processing flow of object region determination processing by the image information processing apparatus 10 according to the second embodiment. The flowchart shown in FIG. 6 is different from the flowchart shown in FIG. 4 in that it has steps S2a1, S6, and S7. Specifically, the segment regional group extraction section 12 refers to the above-described retention solution (S2a1) before extracting a segment region (S2a). Then, the image information processing apparatus 10 extracts the new segment region such that at least one segment region of a newly-structured segment regional group is the same as or very close to the segment region of the retention solution. For example, the image information processing apparatus 10 selects the segment region of the retention solution and randomly adjusts the position of the segment region in an image. In this case, the possibility of setting the position of the segment region near a previous position may be high.

Figure 7:
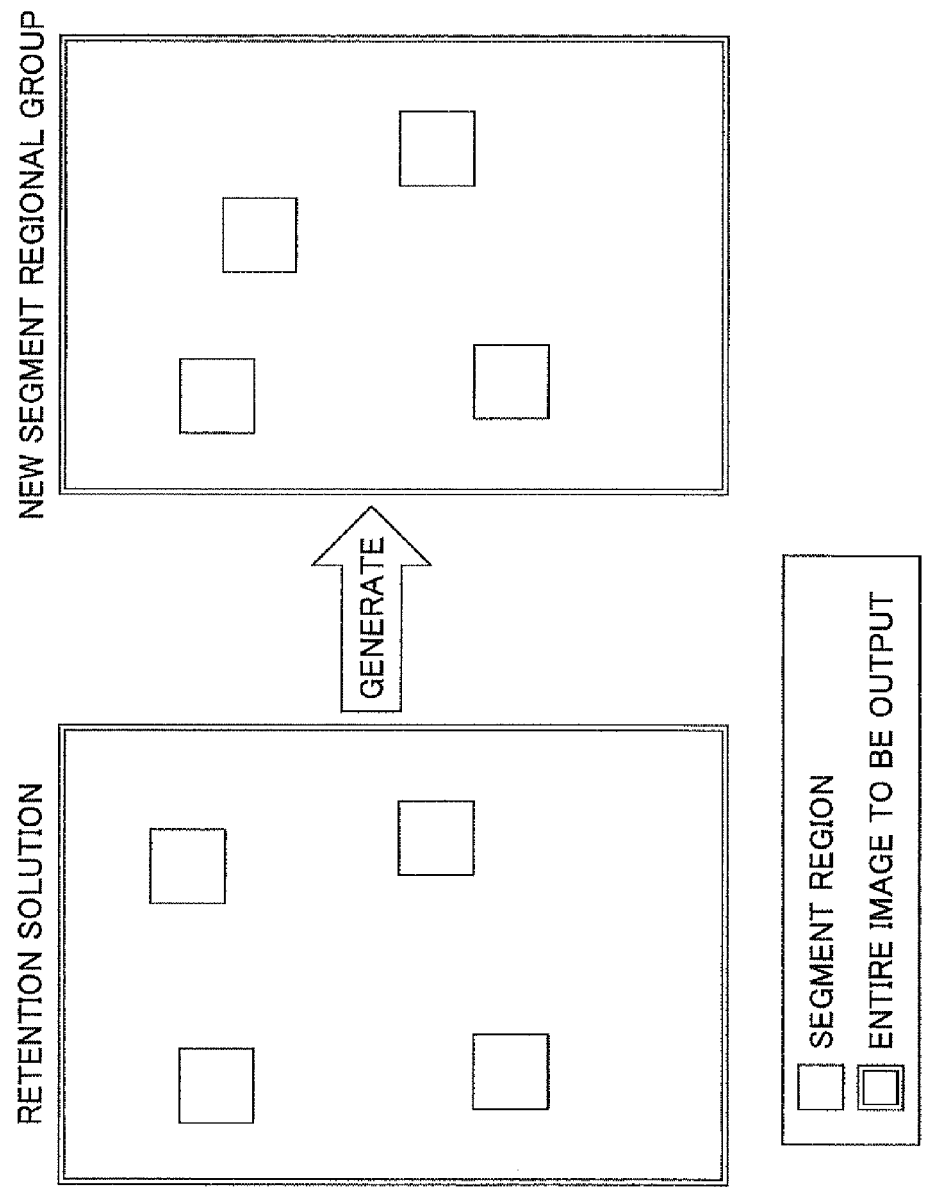
FIG. 7 is a schematic diagram for explaining an example of a relationship between the retention solution of the image information processing apparatus according to the second embodiment and a newly-extracted segment regional group.

FIG. 7 is a schematic diagram for explaining an example of the relationship between the retention solution of the image information processing apparatus 10 according to the second embodiment and a newly-extracted segment regional group. In this example, the segment regional group is composed of four segment regions, and three of the four segment regions of the newly-extracted segment regional group are completely the same as the segment regions of the retention solution. That is, the newly-extracted segment regional group is extracted in which only one of the four segment regions of the retention solution is replaced by another segment region.

Figure 8:
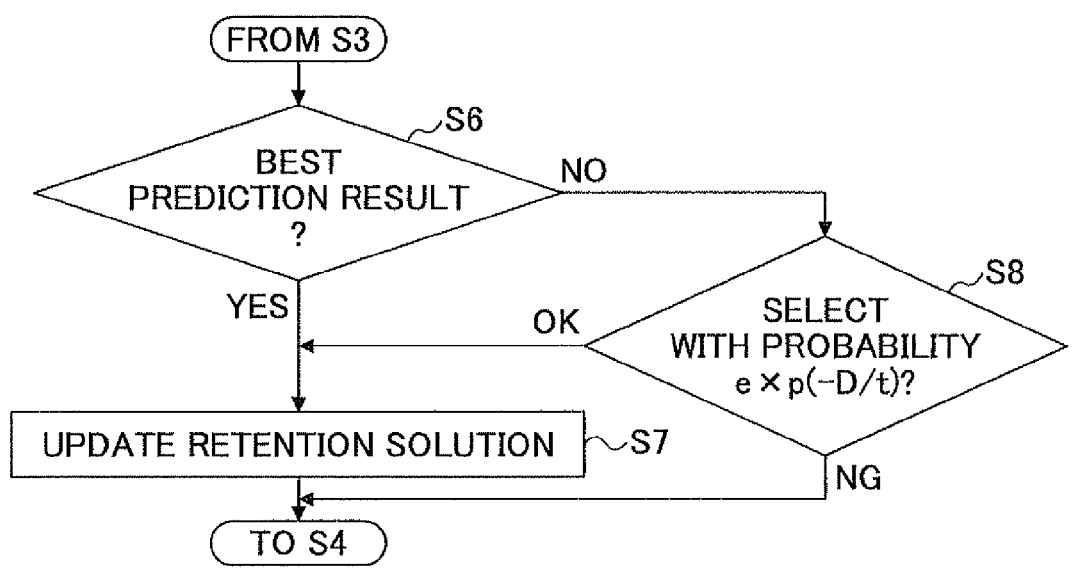
FIG. 8 is a partial flowchart showing a part of the processing flow when a simulated annealing method is used.

An example of a method for extracting a segment region very close to the segment region of retention solution may include a hill-climbing method. The hill-climbing method is a search method based on the principle that better solutions are of a similar structure, and can efficiently search for a better solution while changing a part of a retention solution. However, since a retention solution is updated only when a solution is improved, the method is likely to be stuck with a local solution. Therefore, as a method for finding a more comprehensive solution, a multi-start hill-climbing method in which the hill-climbing method is applied to plural initial solutions is known. Further, a simulated annealing method is also known in which a retention solution is updated with a specific probability even when a solution is degraded. When the simulated annealing method is used, step S8 is performed in addition to steps S6 and S7 as shown in FIG. 8. In other word, if a result of color reproducibility of an entire image in a newly-extracted segment regional group is not the best one (N in S6), a difference between the result and the result of a retention solution is regarded as a degraded amount (d). Then, with the probability $(\exp(-d/t)$ wherein t is a constant greater than zero) based on the degraded amount, the retention solution is updated with the newly-extracted segment regional group. That is, a segment regional group having a smaller degraded amount would be updated as a retention solution with high probability even if the result is worse than the retention solution. The constant t is used to adjust the probability of updating the retention solution, and set to be a great value at the beginning of search and gradually decrease to zero. Thus, it is possible to widely search a solution space with such as a random search at the beginning of search and gradually adopt the hill-climbing method as the search advances for a better adjacent solution.

An optimization method is not limited to the hill-climbing method and the simulated annealing method described above, but various methods such as a genetic algorithm and a taboo search method are available.

Next, a description is made of the modifications of the image information processing apparatus 10 according to the first mode of the present invention. Note that unless otherwise specified, the configuration of the image information processing apparatus 10 according to the respective modifications are the same as the configuration of the image information processing apparatus 10 according to the first mode of the present invention.

(First Modification)

Some image forming apparatuses have the characteristic of degrading color reproducibility at an image region far from a specific segment region when adjusting image forming performance to suit the specific segment region. For example, this is caused by the decentering of a drum-shaped photosensitive body.

In order to deal with this problem, the image information processing apparatus according to a first modification uses as an algorithm the following formula (2) instead of the formula (1) described above.

$$e_{position}(y|x_i) = c//y-x_i//^2 d \qquad \text{Formula (2)}$$

In the formula (2), a left side expresses the prediction value of the result of color reproducibility at any position in an entire image. Further, "y" expresses any position in the entire image. Further, "$x_i$" expresses the position of the i-th segment region in the entire image among N-pieces of segment regions extracted by the segment regional group extraction unit 12. Further, "c" and "d" each express a constant.

The color reproducibility prediction unit 13 first sets 1 to i (i=1), and then calculates $e_{position}(y|x_i)$ with respect to a first segment region. Next, the color reproducibility prediction unit 13 sets 2 to i (i=2), and then calculates $e_{position}(y|x_i)$ in the same manner. The color reproducibility prediction unit 13 repeatedly performs this processing until N is set to i ($x_{i=N}$). Thus, after the calculation of $e_{position}(y|x_{i=1})$ through $e_{position}(y|x_{i=N})$, an average value of the calculated results of color reproducibility or the best value thereof is obtained as the prediction value of color reproducibility at the position y when the image forming performance is adjusted to correspond to the first through N-th segment regions. With respect to the position y, the leftmost position in the entire image is selected and substituted into the formula (2) to thereby calculate the prediction value. Then, the position is shifted by one in a right direction. The shifted position is regarded as y and substituted into the formula (2) to thereby calculate the prediction value. The processing of shifting the position and substituting the shifted position into the formula (2) to thereby calculate the prediction value is repeatedly performed until all the positions of the entire image are covered. Then, an average value of the calculated results or the best value thereof is obtained as the prediction value of color reproducibility of the entire image. This prediction value is regarded as the result of color reproducibility of the entire image when the image forming performance is adjusted to correspond to the first through N-th segment regions.

(Second Modification)

The image information processing apparatus according to a second modification uses as an algorithm the following formula (3) instead of the formula (1) described above.

$$e(w, y|x_i, z_i) = e_{position}(y|x_i) \times e_{color}(w|x_i) \qquad \text{Formula (3)}$$

That is, the result of color reproducibility of an entire image is calculated by multiplying a solution according to the formula (1) by the solution according to the formula (2).

The above description exemplifies the processing of color image data including pixel values showing brightness for each of the four color components Y, M, C, and K. However, it is also possible to process binary image data and grayscale images showing the brightness of only black and white depending on pixel values; color image data including pixel values showing brightness for each of the three color components R (red), G (green), and B (blue); spectral image data and color image data including pixel values showing the brightness for each of four or more color components; or the like.

As described above, in the image information processing apparatus 10 according to the first embodiment, the evenness degree calculation section 12b is configured to calculate the evenness degree of a segment region based on at least any one of the dispersion degree of pixel values, a difference between the maximum value and the minimum value of the pixel values, and the frequency characteristic of the pixel values as color information of pixels in the segment region. With this configuration, a numerical value having high correlation with the density evenness of the segment region can be regarded as the evenness degree.

Further, the image information processing apparatus 10 according to the first embodiment has the evenness degree calculation section 12b that calculates the evenness degree of color density in an extracted segment region, the region classification section 12c that selects only a segment region showing an excellent calculation result of the evenness degree, and the segment region storage section 12d that outputs the image information of the segment region to the color reproducibility prediction section 13 as a prediction object of the result of color reproducibility. Note that the region classification section 12c and the segment region storage section 12d serve as a prediction object selection unit. Thus, even if a segment region having a relatively large area is extracted, the image information processing apparatus 10 can evaluate well the color of the segment region.

Further, the image information processing apparatus 10 according to the second embodiment has the segment region extraction unit 12 that performs the processing of extracting a new segment regional group based on a retention solution as a prediction result by the color reproducibility prediction section 13. Thus, by extracting a segment region close to the segment region of a retention solution, the image information processing apparatus can increase the likelihood of selecting a segment regional group showing a better result.

Next, a description is made of an image processing apparatus according to a second mode of the present invention.

Figure 9:
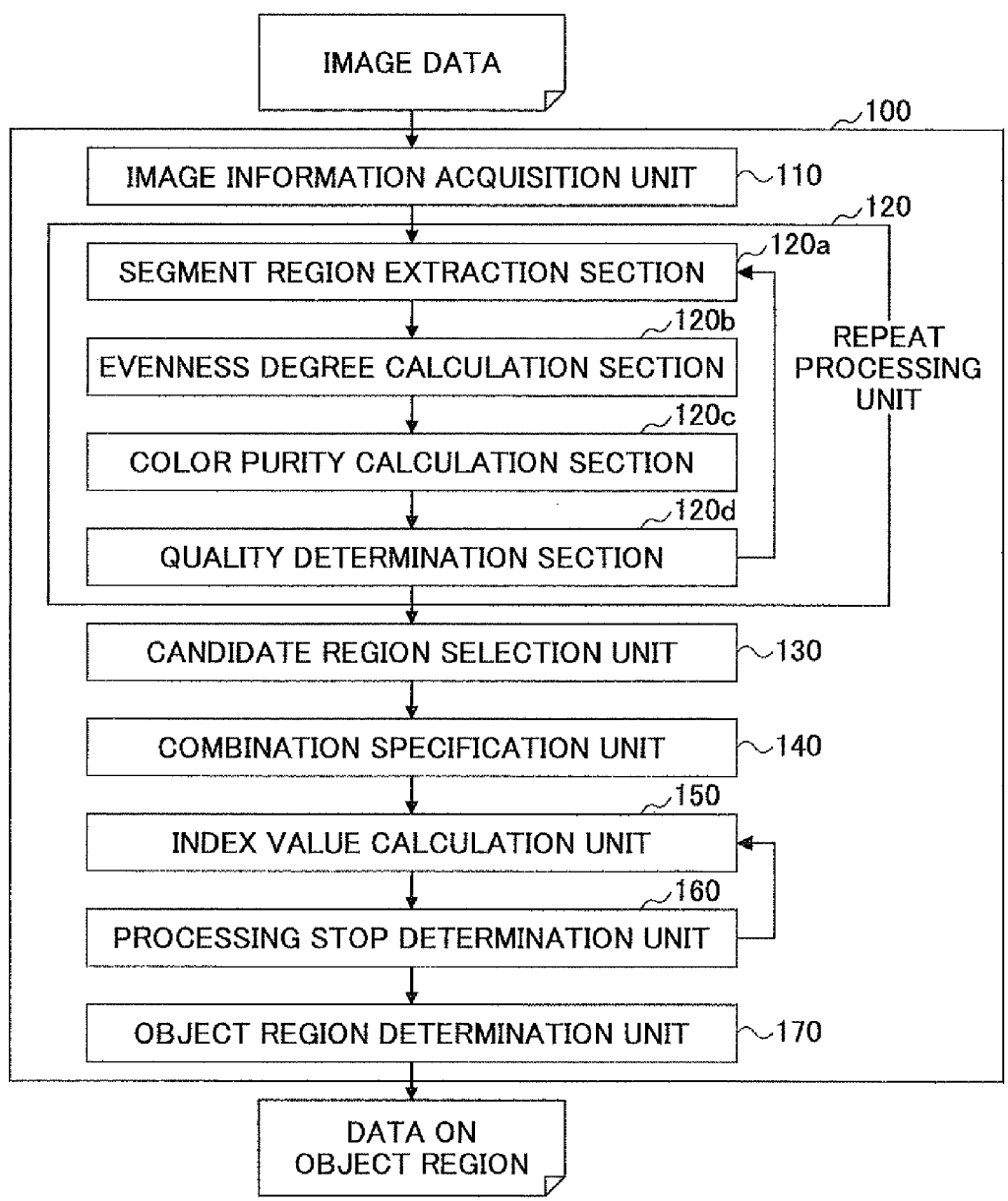
FIG. 9 is a block diagram showing the configuration of a substantial part of an image processing apparatus according to a second mode of the present invention.

FIG. 9 is a block diagram showing the configuration of a substantial part of an image processing apparatus 100 according to the second mode of the present invention. As shown in FIG. 9, the image processing apparatus 100 has an image information acquisition unit 110, a repeat processing unit 120, a candidate region selection unit 130, a combination specification unit 140, an index value calculation unit 150, a processing stop determination unit 160, an object region determination unit 170, and the like. Further, the repeat processing unit 120 has a segment region extraction section 120a, an evenness degree calculation section 120b, a color purity calculation section 120c, and a quality determination section 120d.

The image information acquisition unit 110 of the image processing apparatus 100 acquires image data transmitted from a user via a personal computer or the like. The image data include pixel values expressing the brightness of single-color components of C (cyan), M (magenta), Y (yellow), and K (black) for each of plural pixels constituting an image and arranged in a matrix pattern, and are original image data output from the personal computer or the like to a printer. The image processing apparatus 100 determines which region is specified as an object for color inspection from the entire region of the image data. After this determination by the image processing apparatus 100, when scanned image data obtained by scanning an output image are input to the image processing apparatus 100, the image processing apparatus 100 specifies the object region in the output image based on the matrix position of the respective pixels and compares the color data of the object region with its original color data, thereby evaluating an output color.

Prior to determining an object region for color inspection in original image data, the image processing apparatus 100 first determines the combinations of segment regions suitable for color inspection from the entire region of the image data for each of the four colors C, M, Y, and K.

Figure 10:
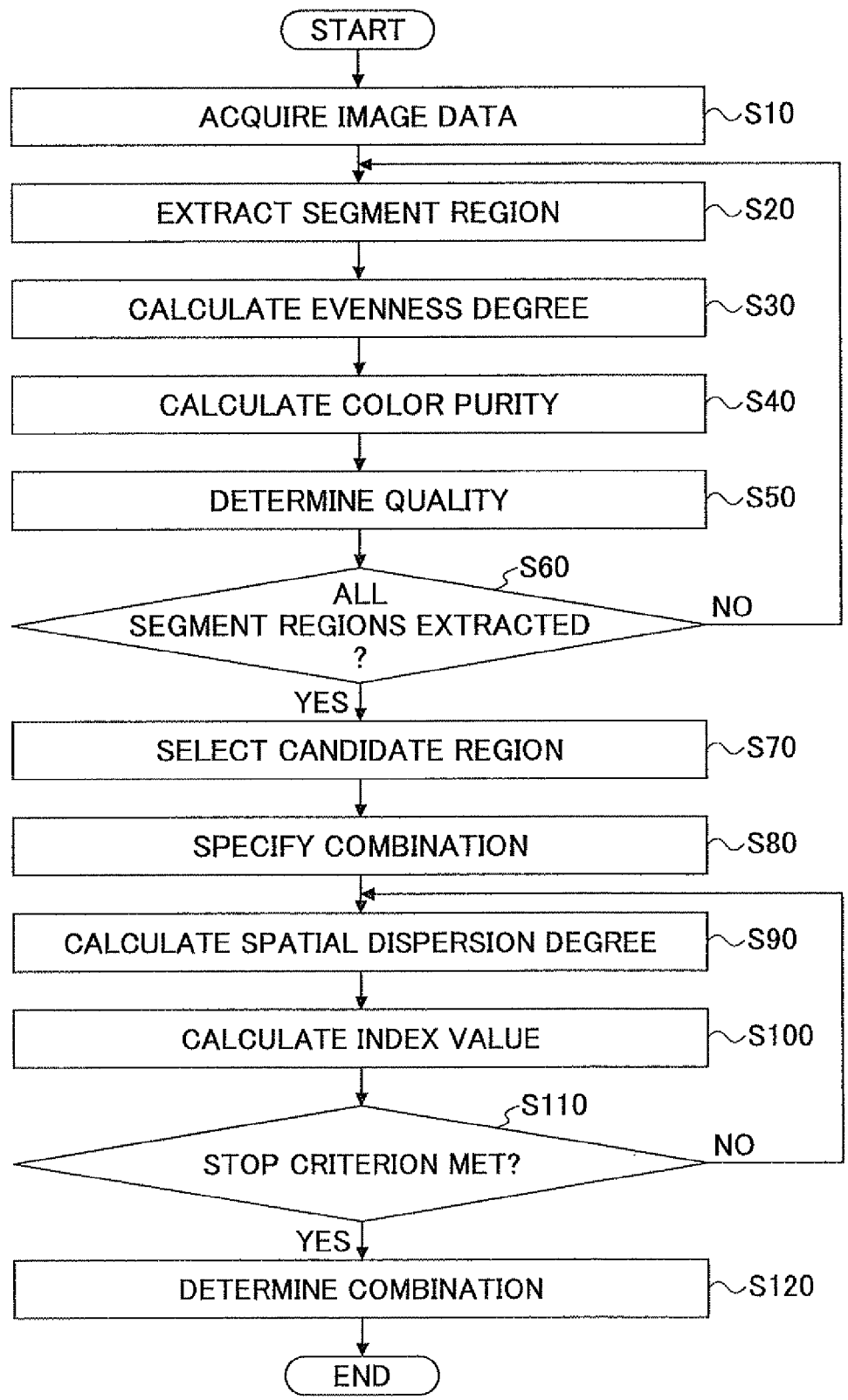
FIG. 10 is a flowchart showing the processing flow of determining an object region by the image processing apparatus.

FIG. 10 is a flowchart showing the processing flow of determining an object region by the image processing apparatus 100. The image processing apparatus 100 first acquires image data by using the image information acquisition unit 110 (step 10: step is hereinafter represented as S). Then, the repeat processing unit 120 repeatedly performs steps S20 through S60. Specifically, assuming that a pixel placed at a predetermined position of a pixel matrix expressed by the image data is set as a subject pixel, a region having a predetermined size about the subject pixel is extracted as a segment region. For example, the pixel placed at the 51st column and the 51st row from the upper left side of the pixel matrix is set as the subject pixel, and the rectangular region of 101 pixels× 101 pixels (about 4 mm square) is extracted as the segment region at the first time. As shown in FIG. 9, this extraction is performed by the segment regional group extraction section 120a of the repeat processing unit 120.

The evenness degree calculation section 120b of the repeat processing unit 120 calculates an evenness degree showing density evenness of the entirety of the segment region while referring to the pixel values of respective pixels (colors C, M, Y, and K) in the extracted segment region (S20). The evenness degree may be calculated according to various methods. As a first example, the evenness degree may be calculated as follows. In other words, the dispersion of the respective pixels of the colors C, M, Y, and K is first calculated. Then, the sum of the dispersion with a negative sign is regarded as the evenness degree of the segment region.

As a second example, the evenness degree may be calculated according to the determinant of a variance-covariance matrix. Specifically, the variance and covariance of the respective pixels in the segment region are calculated for each of the colors C, M, Y, and K. Then, a 4×4 variance-covariance matrix in which the variance is arranged in diagonal components and the covariance is arranged in non-diagonal components is structured, and the determinant of the matrix is calculated. Further, the value of the determinant with a negative sign may be regarded as the evenness degree. This is because the distribution of the respective pixels in a CMYK space can be evaluated with the determinant of the variance-covariance matrix. The second example is superior to the first example in that it can evaluate the spread of the colors between difference components.

Moreover, as a third example, the evenness degree may be calculated according to the frequency characteristics of the colors. Specifically, Fourier transform is performed using the respective pixels in a segment region, and the square sum of the absolute value of a Fourier coefficient of a specific frequency is calculated. The sum with a negative sign added is regarded as the evenness degree. The specific frequency may include plural frequencies. According to the evenness degree of the first example, an image subjected to halftone processing is influenced by the pattern of halftone processing. Therefore, an even region may not be detected. As opposed to this, according to the evenness degree of the third example, the square sum of the absolute value of a Fourier coefficient of a specific frequency is used. Therefore, the evenness degree free from the influence by halftone processing can be calculated.

The calculation of the evenness degree calculated in step S30 is not limited to the first through third examples described above, but known evenness degree calculation techniques are available.

After the calculation of the evenness degree of the segment region by the evenness degree calculation section 120, the repeat processing unit 120 calculates color purity for each of the colors C, M, Y, and K in the segment region by the color purity calculation section 120c (S4). The color purity may be calculated according to various methods. As a first example, the color purity may be calculated as follows. In other words, an average value of the pixel values of respective pixels in the segment region is calculated, and then the calculated average value is converted into a dot in a uniform color space such as L*a*b* and L*u*v*. After that, Euclidian distances between the converted dot and the dots of the colors C, M, Y, and K in the uniform color space are calculated. As a result, the minimum values of the Euclidian distances are regarded as the color purity of the colors C, M, Y, and K.

As a second example, the color purity can be calculated according to the secondary expression of the component amounts of the colors C, M, Y, and K. Specifically, average values mC, mM, mY, and mK are calculated for the colors C, M, Y, and K of respective pixels in the segment region. Then, assuming that a four-dimensional vertical vector using the average values mC, mM, mY, and mK as elements is $\mu$ and a four-dimensional vertical vector w and a 4×4 square matrix Q are design parameters, the color purity $f(\mu)$ is calculated according to the following mathematical formula.

$$f(\mu)=w^T\mu+\mu^T Q\mu \qquad \text{(Mathematical Formula 1)}$$

Figure 11:
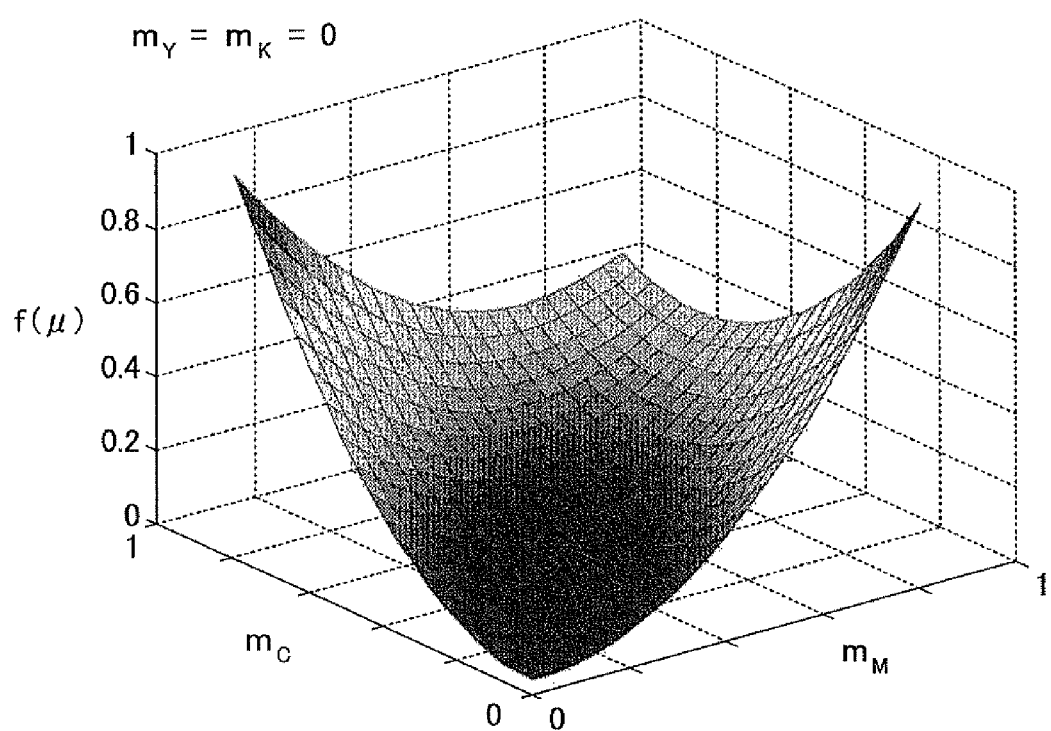
FIG. 11 is a schematic diagram showing the shape of a function where color purity $f(\mu)$ is defined when the diagonal component of a square matrix Q1 is positive, the non-diagonal component thereof is negative, w is a zero vector, and the relationship $mY=mK=0$ is established.

A superscript T in the mathematical formula 1 expresses transposition. Setting the non-diagonal component of Q to be negative makes it possible to degrade the color purity with respect to the product of the different components of the colors C, M, Y, and K. On the other hand, setting the diagonal component of Q to be positive makes it possible to improve the color purity with respect to the square value of the colors C, M, Y, and K. Setting w makes it possible to adjust a point at which the color purity becomes the maximum. FIG. 11 shows the shape of a function where the color purity $f(\mu)$ is defined when the diagonal component of the square matrix Q in the mathematical formula 1 is positive, the non-diagonal component thereof is negative, w is a zero vector, and the relationship mY=mK=0 is established. It is found that the color purity becomes high when a color is nearly single and the density of the color is high while the color purity becomes low when the colors C and M are mixed together with the same ratio. In the second example, the color purity is expressed by the secondary expression of the average value of the colors C, M, Y, and K. However, the color purity may be expressed by a cubic or higher expression. In this case also, it is only required to set a coefficient such that the color purity degrades with respect to the product of the different components of the colors C, M, Y, and K and improves with respect to single color light. Note that the color purity is not limited to those described in the first and second examples, but known color-purity calculation techniques are available.

After the calculation of the color purity of the colors C, M, Y, and K in the segment region by the color purity calculation section 120c, the repeat processing unit 120 determines whether the segment region is excellent in evenness degree and color purity by the quality determination section 120d (S50). This determination processing is performed for each of the colors C, M, Y, and K. More specifically, for each of the colors C, M, Y, and K, the quality determination section 120d determines that the segment region is an excellent segment region if the evenness degree is equal to or greater than a predetermined threshold and the color purity is equal to or greater than a predetermined threshold, and determines that the segment region is not an excellent segment region if any of the evenness degree and the color purity is less than the threshold.

After the determination of the quality of the segment region by the quality determination section 120d, the repeat processing unit 120 determines whether all the segment regions have been extracted (extraction of all the segment regions in the entire image has been completed) (S60). If the repeat processing unit 120 determines that one or more segment regions have not been extracted (N in S60), the repeat processing unit 120 returns the processing flow to step S20 to repeatedly perform steps S20 through S60. At this time, when a segment region is extracted, for example, the second time, the position of the subject pixel is shifted by one pixel in a right direction. As a result, the pixel placed at the 52nd column and the 51st row from the upper left side is regarded as the subject pixel, and the rectangular region of 101 pixels×101 pixels is extracting a segment region the third, fourth, n-th time, the position of the subject pixel is shifted by one pixel in the right direction. After the position of the subject pixel in a column direction is shifted left to the position at the 51st row from a right end, the position of the subject pixel in the column direction is returned right to the position at the 51st row from a left end and the position of the subject pixel in a row direction is shifted downward by one pixel. Then, the position of the subject pixel is repeatedly shifted right by one pixel. As described above, the position of the subject pixel is successively shifted like raster scanning, thereby covering the entire image.

Note that instead of shifting the position of the subject pixel by one pixel, respective segment regions may be extracted in such a manner that the edges of the extracted segment regions are not overlapped with each other. For example, after the extraction of the segment region of 101 pixels×101 pixels about the subject pixel at the 51st column and the 51st row, a segment region of 101 pixels×101 pixels about a subject pixel at the 102nd column and the 51st row is extracted.

After the determination of the quality and the extraction of the segment regions from the entire image, the repeat processing unit 120 outputs positional information on all the excellent segment regions to the candidate region selection unit 130. Based on the positional information on the excellent segment regions, the candidate region selection unit 130 selects as a candidate region a region having many excellent segment regions from the entire region of the image (S7).

Figure 12:
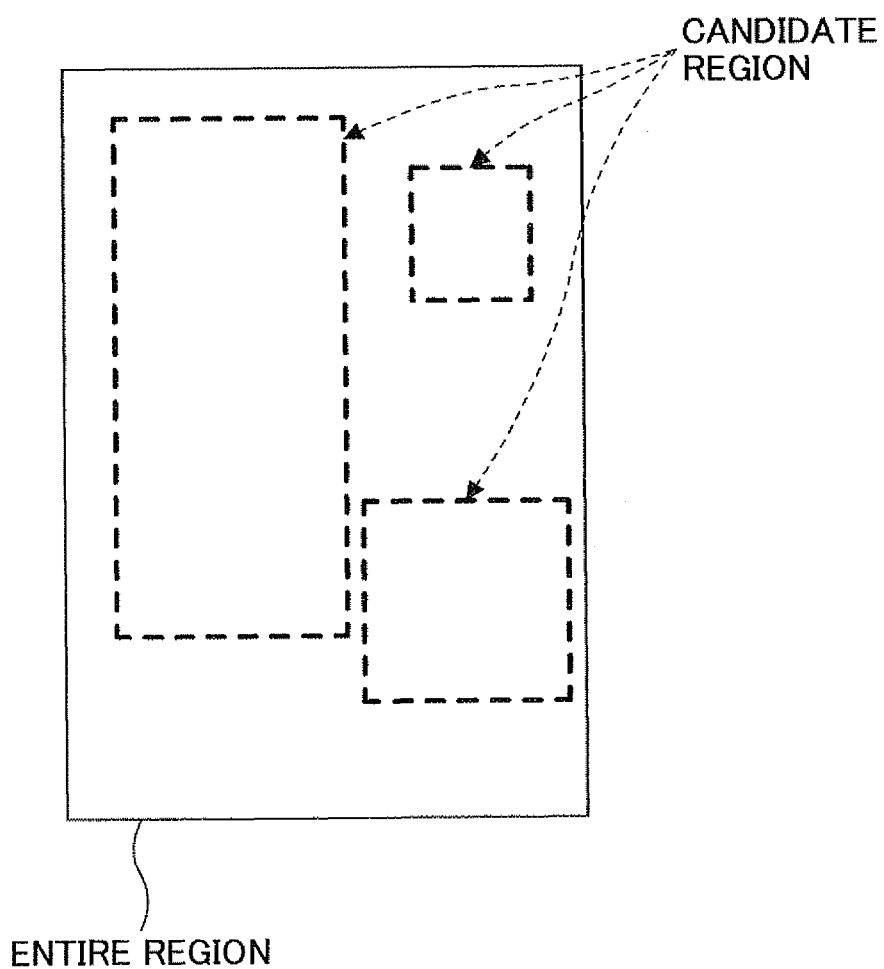
FIG. 12 is a schematic diagram for explaining an example of candidate regions selected in step S70 of FIG. 10.
Figure 13:
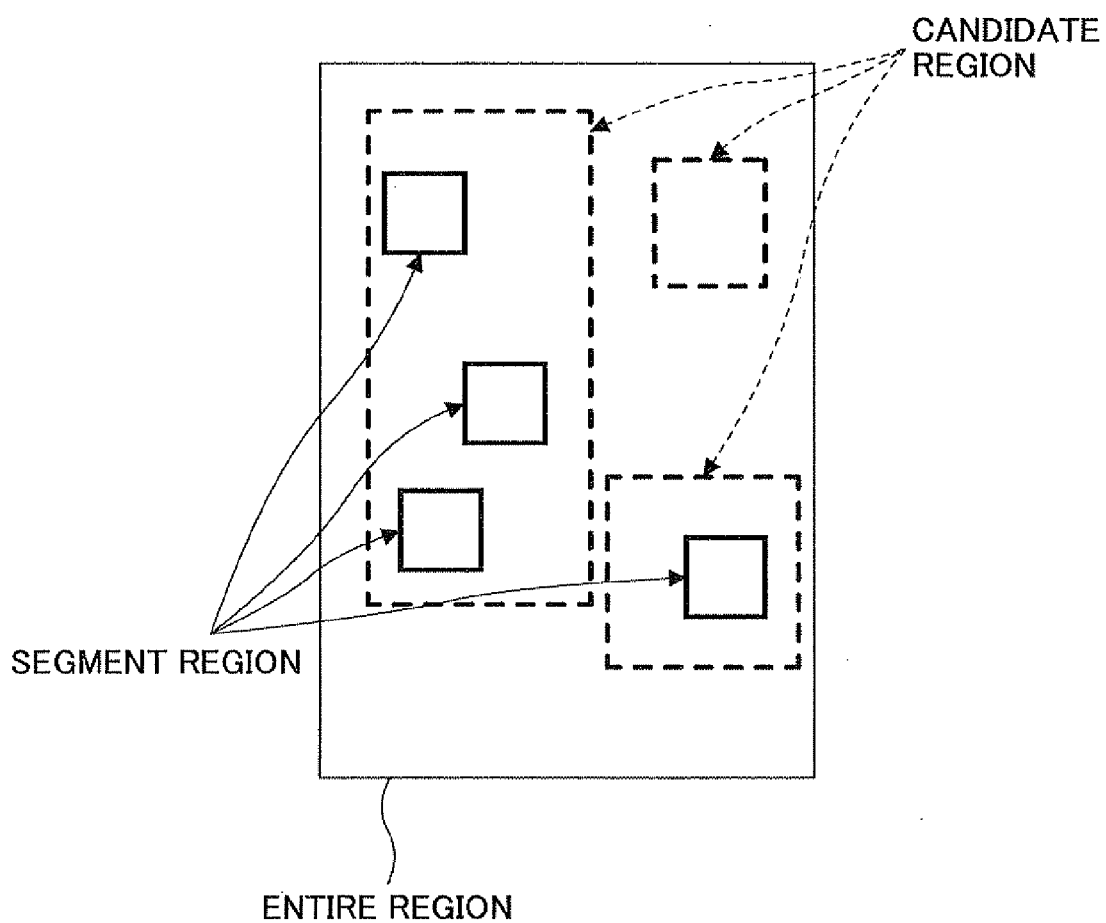
FIG. 13 is a schematic diagram showing an example of a relationship between the entire region, a combination of four segment regions, and candidate regions of an image.

FIG. 12 is a schematic diagram for explaining an example of the candidate regions selected in step S70. In this example, three large, medium, and small sized candidate regions are selected from the entire region of an image. After the selection of the candidate regions by the candidate region selection unit 130, the combination specification unit 140 specifies all possible different combinations established when a predetermined number of the segment regions are selected from all the segment regions included in the candidate regions and combined with each other. Here, the predetermined number is set to four. In the example in which the three large, medium, and small sized candidate regions shown in FIG. 12 are selected, all possible different combinations established when four of the segment regions are selected from all the segment regions included in the candidate regions and combined with each other are shown in FIG. 13.

Information items on the combinations thus specified are transmitted from the combination specification unit 140 to the index value calculation unit 150. The index value calculation unit 150 randomly selects one of the information items on all the combinations transmitted from the combination specification unit 140, and then calculates a spatial dispersion degree (S90) and an index value (S100) with respect to the segment regions of the selected information.

Figure 14:
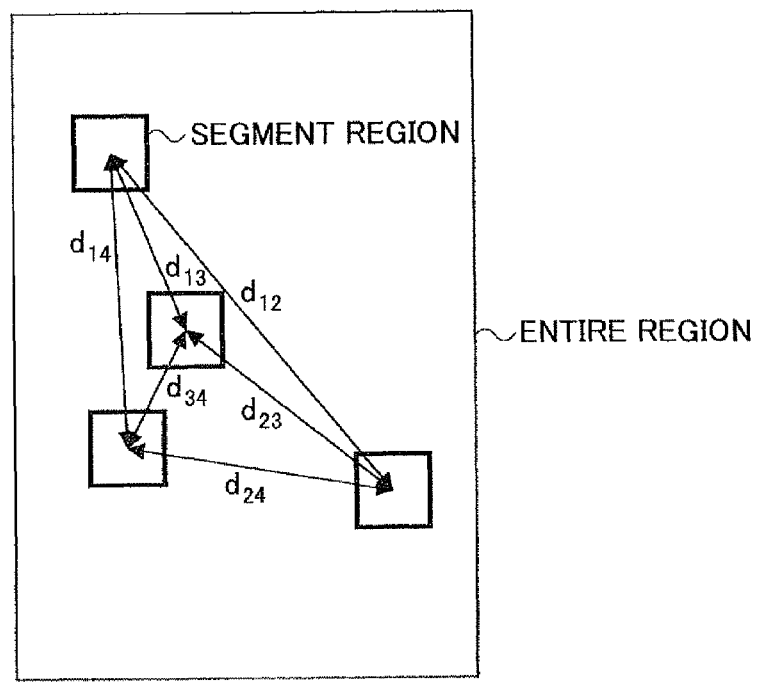
FIG. 14 is a schematic diagram for explaining a method for calculating a spatial dispersion degree based on Euclidian distances between gravity centers of segment regions.

As a first example of calculating the spatial dispersion degree calculated in step S90, the spatial dispersion degree can be calculated according to Euclidian distances between the gravity centers of the respective segment regions. Specifically, as shown in FIG. 14, assuming that the (geographic) gravity centers of the four segment regions included in the combination are representative points, the sum of inverse numbers of the Euclidian distances (d12, d13, d14, d23, d24, and d34) between the representative points is calculated, and then a negative sign is added to the sum. Thus, the spatial dispersion degree is obtained.

As a second example of calculating the spatial dispersion degree, the spatial dispersion degree can be calculated according to variance (as a statistical value) between the respective segment regions. Specifically, the coordinates of the representative points (e.g., the gravity centers) of the four segment regions are first calculated, and then a variance-covariance matrix at horizontal and vertical positions is calculated. Next, the trace or the determinant of the variance-covariance matrix is specified as the spatial dispersion degree. Note that the calculation of the spatial dispersion degree is not limited to the first and the second examples described above, but known spatial dispersion degree calculation techniques are available.

After the calculation of the spatial dispersion degree with respect to the combination (S90), the index value calculation unit 150 calculates an index value according to the following mathematical formula based on the spatial dispersion degree and the evenness degree and the color purity of the four segment regions with respect to the combination.

INDEX VALUE=$a$×Σ[EVENNESS DEGREE]+$b$×Σ [COLOR PURITY]+$c$×Σ[SPATIAL DISPERSION DEGREE]    (Mathematical Formula 2)

In this formula, "a" is a weighting coefficient expressing the evenness degree, "b" is a weighting coefficient expressing the color purity, and "c" is a weighting coefficient expressing the spatial dispersion degree. Further, symbols Σ before the evenness degree, the color purity, and the spatial dispersion degree express that the evenness degrees, the color purities, and the spatial dispersion degrees of the four segment regions are summed. The better the combination of the evenness degree, the color purity, and the spatial dispersion degree is, the larger the index value becomes.

After the calculation of the index value, the index value calculation unit 150 transmits the result of the calculation to the object region determination unit 170 via the processing stop determination unit 160. The processing stop determination unit 160 previously stores a determination criterion for determining whether the calculation of an index value should be stopped. Here, the number of times calculating an index value is adopted as the determination criterion. For example, the processing stop determination unit 160 defaults at 1000 times (index values are calculated for each of 1000 different combinations) as a threshold of the number of times calculating an index value, and determines whether the number of times calculating an index value has actually reached the threshold (S110). Then, if the number has reached the threshold, the processing stop determination unit 160 determines that the calculations should be stopped and transmits the result of the determination to the object region determination unit 170. On the other hand, if it is determined that the number of times calculating an index value has not reached the stop criterion (threshold), the processing stop determination unit 160 transmits an instruction signal for calculating index values of other combinations to the index value calculation unit 150. After receiving the instruction signal, the index value calculation unit 150 randomly selects a non-selected one of all combinations previously provided by the combination specification unit 140, and calculates the index value of the selected combination.

After receiving the signal for stopping the calculation of an index value, the object region determination unit 170 determines, as the combination of the four segment regions to be inspected, the combination (of the four segment regions) showing the largest index value among all the index values that the object region determination unit 170 have received (S120). Then, the object region determination unit 170 outputs the positional data on the combination as object region data.

Note that steps S80 through S120 are performed for each of the colors C, M, Y, and K. Accordingly, the object region determination unit 170 outputs the object region data for each of the colors C, M, Y, and K.

The image processing apparatus having the above configuration regards as excellent segment regions only segment regions excellent in evenness degree and color purity among all the segment regions extracted from the entire region of an image. Then, the image processing apparatus specifies all the combinations of four different segment regions with respect to only candidate regions having relatively many excellent segment regions in the entire region of the image, and then calculates an index value for each of the combinations. The image processing apparatus having this configuration reduces time required for calculating index values compared with a case in which all combinations of four segment regions are specified with respect to all regions extracted from the entire region of an image and index values are calculated for each of the combinations. Therefore, the image processing apparatus can specify the combinations of segment regions having relatively a large evenness degree, color purity, and a spatial dispersion degree from the entire region of an image in a shorter period of time.

The image processing apparatus 100 according to the first mode of the present invention is composed of a personal computer and a program for causing the personal computer to function as an image processing apparatus. The program is stored in an optical disk such as a CD-ROM and a DVD-ROM as a recording medium so as to be readable by a machine, and can be installed in the hard disk of the personal computer via the optical disk. Any of the repeat processing unit 120, the candidate region selection unit 130, the combination specification unit 140, the index value calculation unit 150, the processing stop determination unit 160, and the object region determination unit 170 shown in FIG. 9 is implemented by the arithmetic processing of a CPU of a personal computer as software.

Note here that candidate regions including plural excellent segment regions are selected. However, a part of or all of the candidate regions (the same in size as the segment region) including only one excellent segment region may be selected.

Next, a description is made of a modification of the image processing apparatus 100. Note that unless otherwise specified, the image processing apparatus 100 according to the modification is similar in configuration to the image processing apparatus 100 according to the second mode of the present invention.

Figure 15:
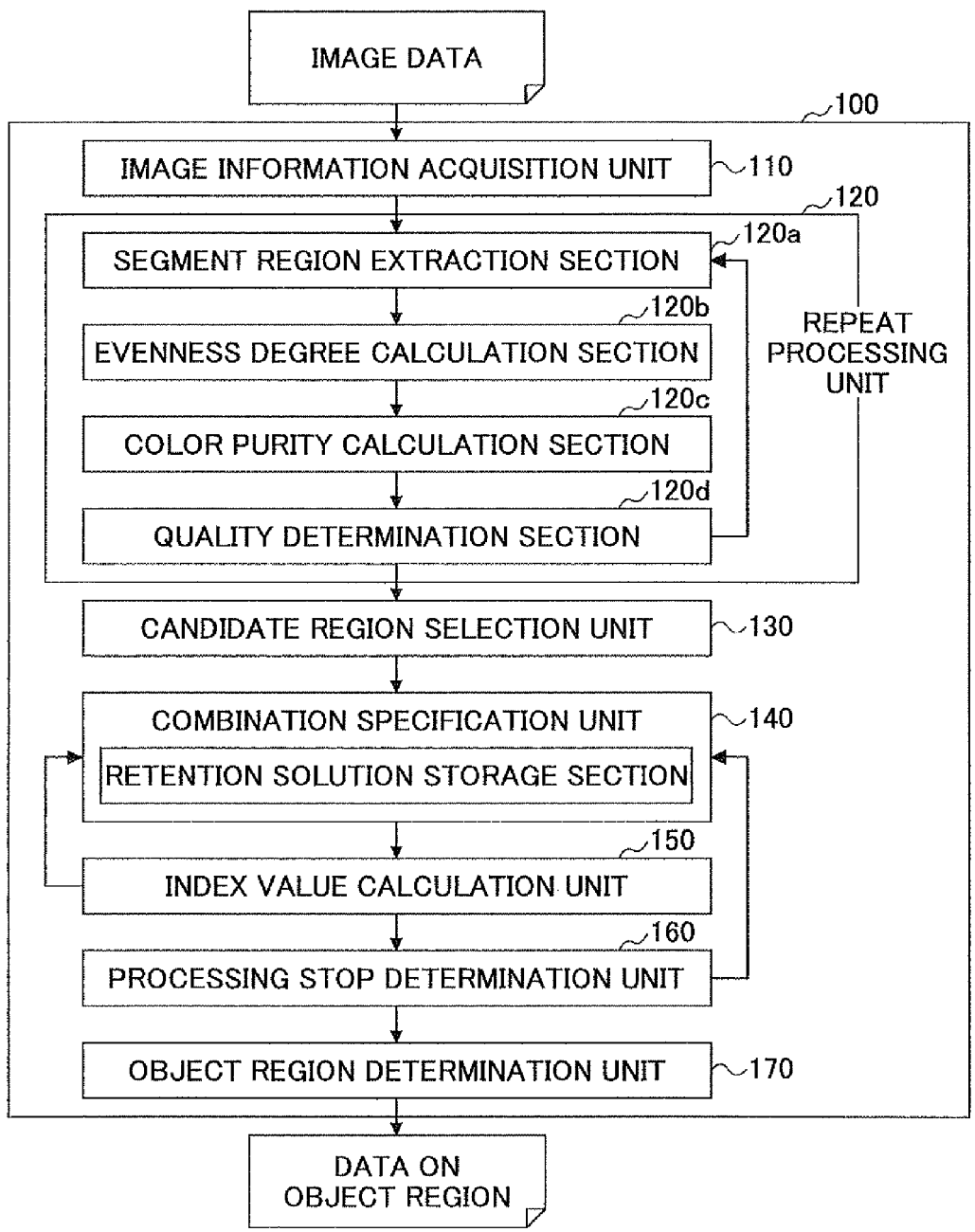
FIG. 15 is a block diagram showing the configuration of a substantial part of the image processing apparatus 100 according to a modification.
Figure 16:
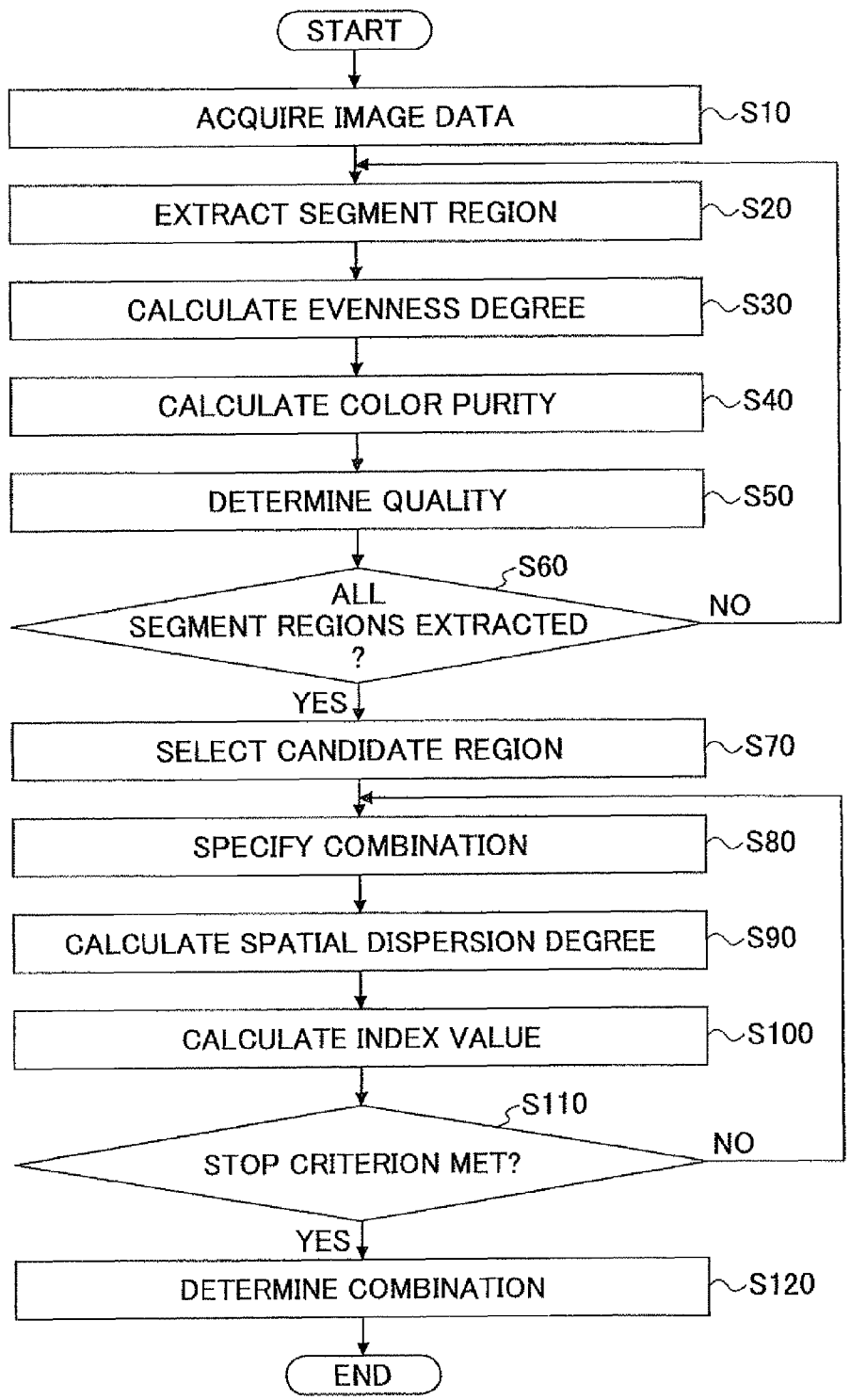
FIG. 16 is a flowchart showing the processing flow of determining an object region by the image processing apparatus according to the modification.

FIG. 15 is a block diagram showing the configuration of a substantial part of the image processing apparatus 100 according to the modification. FIG. 16 is a flowchart showing the processing flow of determining an object region by the image processing apparatus 100 according to the modification. The image processing apparatus 100 according to the modification is different from the image processing apparatus 100 according to the second mode of the present invention in combination specification processing by the combination specification unit 140 and steps after the combination specification processing. The flowchart shown in FIG. 10 is very similar to the flowchart shown in FIG. 16. However, the processing in FIG. 10 returns from step S110 to step S90, while the processing in FIG. 16 returns from step S110 to step S80. Such a difference in returning destinations is attributed to the fact that the index value calculation unit 150 (see FIG. 9) determines a combination of objects for calculating an index value in the processing of FIG. 10 while the combination specification unit 140 (see FIG. 15) determines the same in the processing of FIG. 16.

The combination specification unit 140 of the image processing apparatus 100 according to the modification has a retention solution storage section composed of a RAM or the like. The retention solution storage section stores data on the combinations of data items showing a relatively large index value. Every time the combination specification unit 140 selects and combines four of all segment regions included in candidate regions to specify a new combination, it successively outputs a specification result to the index value calculation unit 150. Then, upon receiving data on the new combination from the combination specification unit 140, the index value calculation unit 150 calculates the index value of the combination. That is, in the second mode of the present invention, the index value calculation unit 150 randomly selects which one of all possible combinations of four segment regions is used for calculating an index value. On the other hand, in the modification, selecting a combination of segment regions is performed by the combination specification unit 140.

After randomly specifying a first combination of four segment regions and outputting its result to the index value calculation unit 150, the combination specification unit 140 waits for the calculation result of an index value from the index value calculation unit 150. Upon receiving the calculation result from the index value calculation unit 150, the combination specification unit 140 stores it in the retention solution storage section together with data on the combination. Next, in the same manner as the above, the combination specification unit 140 randomly specifies a second combination of segment regions and outputs its result to the index value calculation unit 150. After that, the combination specification unit 140 receives the calculation result of an index value from the index value calculation unit 150, and then compares this calculation result with the calculation result stored in the retention solution storage section. If the index value of the newly-specified combination is greater than the index value stored in the retention solution storage section, the combination specification unit 140 updates the data inside the retention solution storage section with the data on the newly-specified combination. On the other hand, if the index value stored in the retention solution storage section is greater than the index value of the newly-specified combination, the combination specification unit 140 leaves the data inside the retention solution storage section as they are. Subsequently, in order to specify a third combination of segment regions, the combination specification unit 140 refers to the combination that is stored in the retention storage section and close in position to the third combination. Thus, the combination specification unit 140 updates a retention solution as occasion demands and specifies a new combination of segment regions based on a retention solution so as to specify a third or later combination of segment regions.

Figure 17:
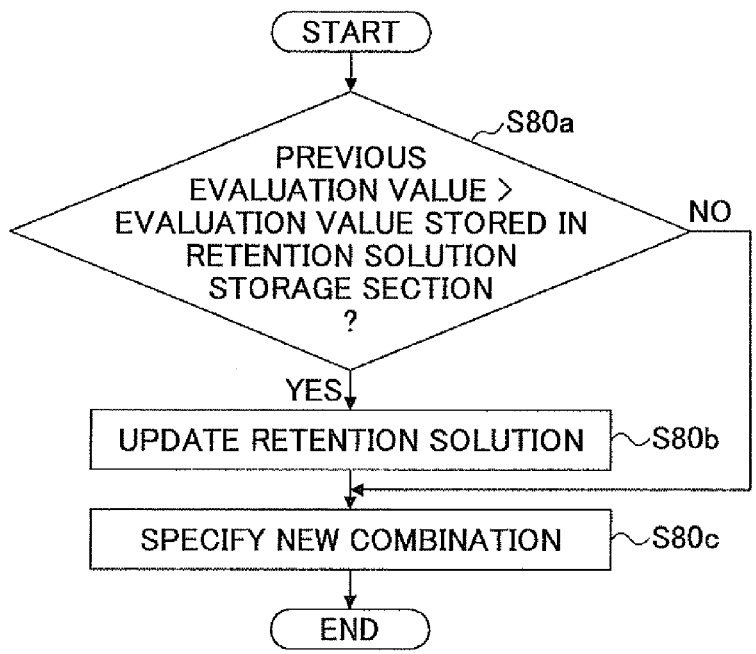
FIG. 17 is a flowchart specifically showing step S80 in the processing flow shown in FIG. 16, i.e., the step performed when a second or later combination of segment regions is specified.

FIG. 17 is a flowchart specifically showing step S80 in the processing flow shown in FIG. 16, i.e., the step performed when a second or later combination of segment regions is specified. As shown in FIG. 17, in order to specify a second or later combination, the combination specification unit 140 determines whether a previous evaluation value (the evaluation value of a first combination when, for example, the second combination is specified) is greater than an evaluation value stored in the retention solution storage section (S80a). If it is determined that the previous evaluation value is greater than the evaluation value stored in the retention solution storage section (Y in S80a), the combination specification unit 140 updates data on the combination and the evaluation value stored in the retention solution storage section with data on the previous evaluation value (S80b). On the other hand, if it is determined that the previous evaluation value is not greater than the evaluation value stored in the retention solution storage section (N in S80a), the combination specification unit 140 maintains the data inside the retention solution storage section as they are. Then, the combination specification unit 140 specifies a combination of segment regions close in position to the combination of segment regions stored in the retention solution storage section as a new combination (S80c).

Thus, the combination specification unit 140 specifies the combination of segment regions close in position to the combination of segment regions stored in the retention solution storage section as a new combination, thereby making it possible to increase the likelihood of selecting a combination of segment regions having a relatively large index value. Accordingly, the combination specification unit 140 can efficiently search for a combination of segment regions having a large index value.

Figure 18:
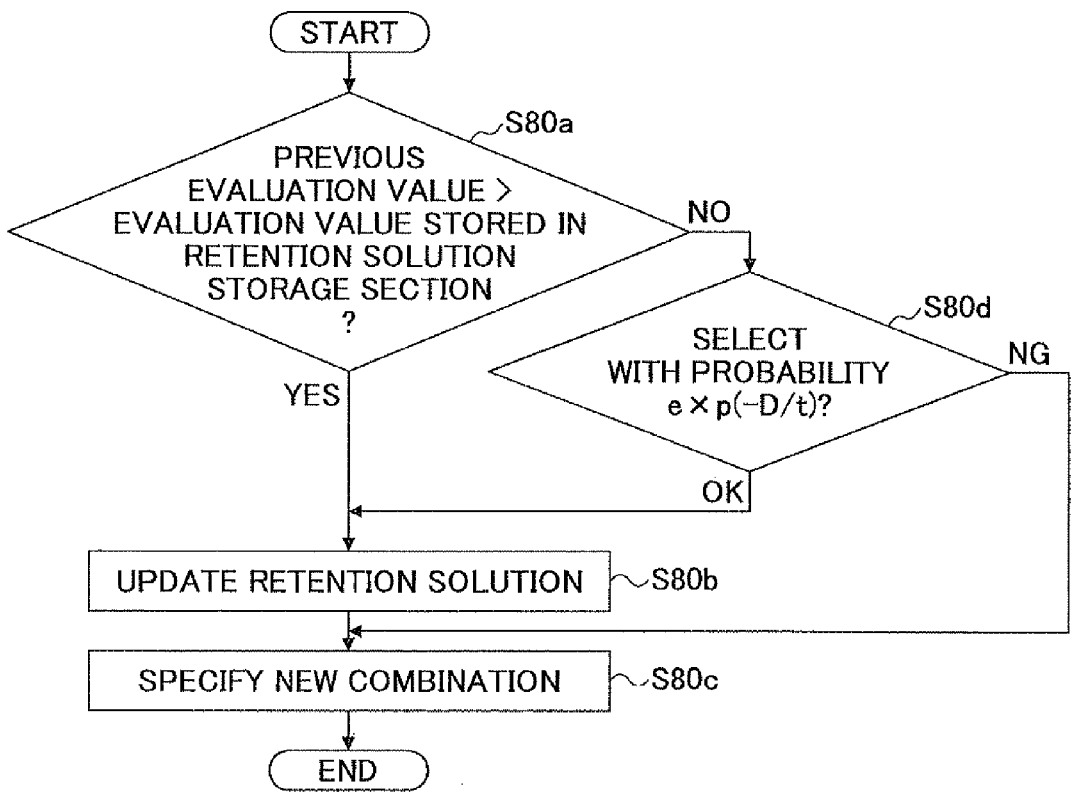
FIG. 18 is a flowchart showing another example of the flowchart shown in FIG. 17.

Note that even if the previous evaluation value is below the evaluation value stored in the retention solution storage section (hereinafter referred to as a retention solution evaluation value) but meets certain conditions, the combination specification unit 140 may update a retention solution. For example, as shown in FIG. 18, assuming that the degraded amount of the previous evaluation value relative to the retention solution evaluation value is d, the retention solution may be updated under the probability $\exp(-d/t)$ based on the parameter t. The value of the parameter t is decreased every time the combination specification unit 140 updates the retention solution. This is called a simulated annealing method.

Further, a stop criterion in step S110 may be such that the frequency of updating a retention solution becomes equal to or less than a certain value (e.g., calculation of an index value is stopped if the retention solution is not updated for ten consecutive times). A method for increasing the likelihood of specifying a combination having a large evaluation value is not limited to the simulated annealing method described above, but any known optimization techniques are available.

Figure 19:
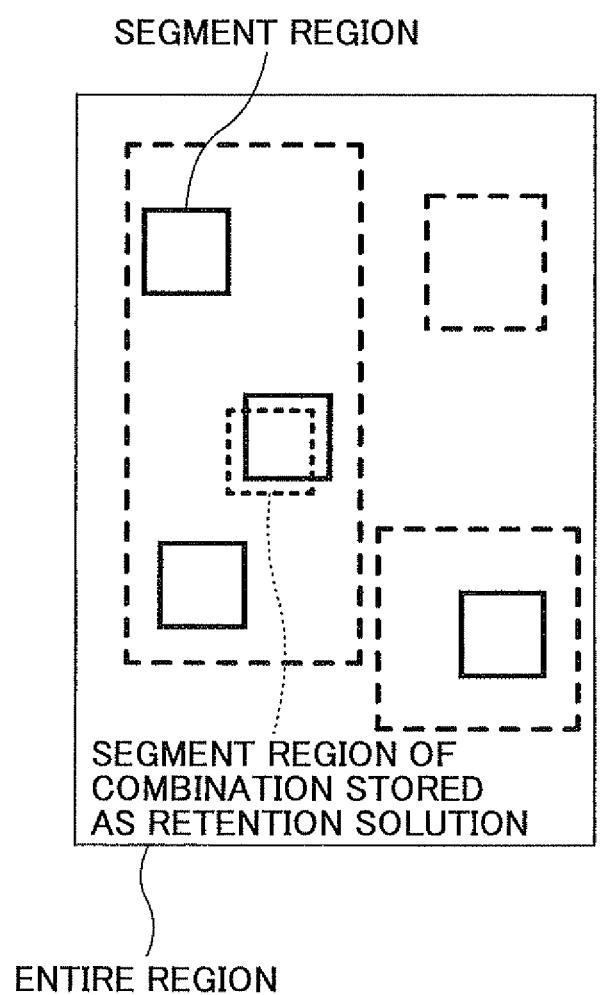
FIG. 19 is a schematic diagram showing a first example of a relationship between a new combination specified by the image processing apparatus and a retention solution combination.

As a first example of a method for specifying a combination of segment regions close in position to a combination of segment regions stored in the retention solution storage section as a new combination of the segment regions, the following method can be used. In other words, this method includes selecting three of four segment regions completely the same as the segment regions of a combination (hereinafter referred to as a retention solution combination) stored in the retention solution storage section, and selecting one segment region partially overlapping or adjacent to the rest of the retention solution combination. For example, assuming that the previous combination of the segment regions is the one shown in FIG. 13, segment regions shown in FIG. 19 are specified as a new combination. In the new combination shown in FIG. 19, three of the four segment regions are completely the same as the segment regions of the retention solution combination shown in FIG. 13. Further, the other one of the four segment regions partially overlaps the rest of the segment regions of the retention solution combination as indicated by dotted lines in FIG. 19.

Figure 20:
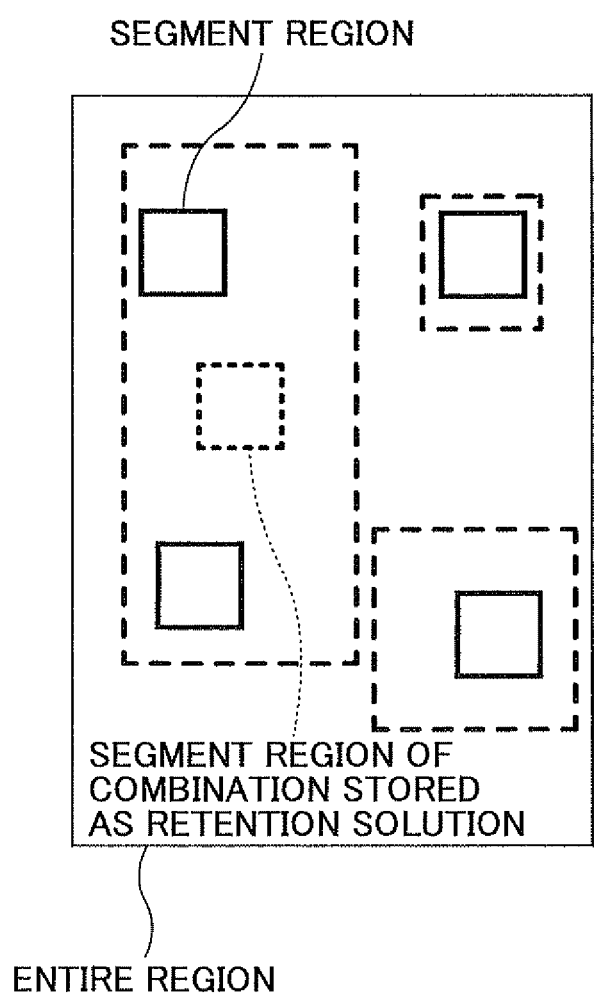
FIG. 20 is a schematic diagram showing a second example of the relationship.

Further, as a second example of a method for specifying a combination of segment regions close in position to a combination of segment regions stored in the retention solution storage section as a new combination of the segment regions, the following method can be used. In other words, this method includes selecting some segment regions completely the same as the segment regions of the retention solution combination stored in the retention solution storage section, and randomly selecting the other segment region. For example, assuming that the previous combination of the segment regions is the one shown in FIG. 13, segment regions shown in FIG. 20 are specified as a new combination. In the new combination shown in FIG. 20, three of the four segment regions are completely the same as the segment regions of the retention solution combination shown in FIG. 13. Further, the other one of the four segment regions is randomly selected from candidate regions as a substitute for the rest of the segment regions of the retention solution combination as indicated by dotted lines in FIG. 20.

The above description exemplifies the processing of color image data including pixel values showing brightness for each of the four color components Y, M, C, and K. However, it is also possible to process binary image data and grayscale images showing the brightness of only black and white depending on pixel values; color image data including pixel values showing brightness for each of the three color components R (red), G (green), and B (blue); spectral image data and color image data including pixel values showing the brightness for each of four or more color components; or the like. Note that in the method of the first example using Euclidian distances in a uniform color space for calculating color purity, the color purity of colors other than C, M, Y, and K can be calculated by changing target colors. Further, in the method of the second example using the secondary formula, the color purity of colors other than C, M, Y, and K can be calculated by changing the use of axes.

In the image processing apparatus 100 according to the second mode of the present invention, the evenness degree calculation unit 120b is configured to calculate the evenness degree of segment regions based on at least any one of the dispersion degree of pixel values, a difference between the maximum value and the minimum value of the pixel values, and the frequency characteristic of the pixel values as color information of pixels of the segment regions. With this configuration, a numerical value having high correlation with the density evenness of the segment regions can be regarded as the evenness degree.

Further, as the first example of calculating color purity in the image processing apparatus 100 according to the second mode of the present invention, the color purity calculation unit 120c is configured to calculate as the color purity the Euclidian distances in a uniform color space between an average value of pixel values as the color information of pixels in segment regions and specific colors C, M, Y, and K. With this configuration, the smaller the Euclidian distances between the average color of the segment regions and the specific colors (C, M, Y, and K) in the uniform color space are, the larger the value of the color purity can be made.

Further, as the second example of calculating color purity in the image processing apparatus 100 according to the second mode of the present invention, the color purity calculation unit 120c is configured to calculate the color purity in which the sign of an average value corresponding to a color to be inspected (C, M, Y, or K) among the average values of the different color components C, M, Y, and K in segment regions is positive (or may be negative) while the signs of average values corresponding to the other colors are different from the sign of the average value corresponding to the color to be inspected. With this configuration, the value of the color purity can be increased toward the positive side as the average color of the segment regions is closer to the color to be inspected.

Further, as the second example of calculating a spatial dispersion degree in the image processing apparatus 100 according to the second mode of the present invention, the index value calculation unit 150 is configured to calculate as the spatial dispersion degree the variance-covariance matrix of representative coordinates of respective segment regions in a combination of four segment regions or an inverse matrix thereof. With this configuration, the dispersibility of the four segment regions can be recognized.

Further, as the first example of calculating a spatial dispersion degree in the image processing apparatus 100 according to the second mode of the present invention, the index value calculation unit 150 is configured to calculate as the spatial dispersion degree the sum of inverse numbers of distances between representative coordinates of respective segment regions in a combination of four segment regions. With this configuration, the dispersibility of the four segment regions can be recognized based on a simple numerical value.

Further, in the image processing apparatus 100 according to the modification, the index value calculation unit 150 is configured to start calculating the index value of a combination specified by the combination specification unit 14 before all possible combinations of all segment regions included in candidate regions are specified by the combination specification unit 140. With this configuration, timing for starting the calculation of an index value can be made earlier compared to a case where the calculation of an index value of each combination is started after all combinations of segment regions are specified.

Further, in the image processing apparatus 100 according to the modification, the index value calculation unit 150 is configured to specify a new combination of segment regions and calculate the index value of the combination based on the index value of a retention solution combination as the history of calculated index values. With this configuration, the likelihood of selecting a combination of segment regions having a relatively large index value can be increased.

Further, in the image processing apparatus 100 according to the second mode of the present invention, the index value calculation unit 150 is configured to calculate an index value based on the sum of values obtained by multiplying an evenness degree, color purity, and a spatial dispersion degree by specific weighting coefficients a, b, and c. With this configuration, the evenness degree, color purity, and the spatial dispersion degree that could most affect variations in index value or could least affect the same can be arbitrarily adjusted along with the adjustment of the ratio of the sizes of the weighting coefficients a, b, and c.

The present application is based on Japanese Priority Application Nos. 2009-273507 filed on Dec. 1, 2009, and 2010-059123 filed on Mar. 16, 2010, with the Japan Patent Office, the entire contents of which are hereby incorporated by reference.

The invention claimed is:

1. An image information processing apparatus that determines, based on image information, a region suitable for inspecting image forming performance of an image forming apparatus in an entire region of an image represented by the image information, the image information processing apparatus comprising:

a segment region extraction unit that extracts a segment region having a predetermined size from the entire region of the image;

a color reproducibility prediction unit that predicts a result of color reproducibility of the entire image by using an algorithm in a case where the image forming performance of the image forming apparatus is adjusted based on a color measurement result of the extracted segment region;

an object region determination unit that determines, as an object region, the segment region showing a best one of the plural results obtained by repeatedly performing extraction processing by the segment region extraction unit and prediction processing by the color reproducibility prediction unit;

an evenness degree calculation unit that calculates an evenness degree of color density in the segment region extracted by the segment region extraction unit; and a prediction object selection unit that selects only the segment region showing an excellent calculation result of the evenness degree and outputs the image information on the segment region to the color reproducibility prediction unit as a prediction object of the result.

2. The image information processing apparatus according to claim 1, wherein
   the evenness degree calculation unit is configured so as to calculate the evenness degree based on at least any one of a dispersion degree of a pixel value, a difference between a maximum value and a minimum value of the pixel value, and a frequency characteristic of the pixel value as color information of a pixel in the segment region.

3. The image information processing apparatus according to claim 1, wherein
   the segment region extraction unit is configured so as to extract a new segment region based on a prediction result by the color reproducibility prediction unit.

4. The image information processing apparatus according to claim 1, wherein,
   in a case where the image forming performance of the image forming apparatus is adjusted in accordance with a color of the segment region extracted by the segment region extraction unit, the algorithm individually predicts the color reproducibility for each of all the other segment regions and calculates a best value or an average value of prediction results as the result of the color reproducibility of the entire image.

5. The image information processing apparatus according to claim 1, wherein,
   in a case where the image forming performance of the image forming apparatus is adjusted in accordance with a position in the entire image of the segment region extracted by the segment region extraction unit, the algorithm individually predicts the color reproducibility with respect to positions of all the other segment regions and calculates a best value or an average value of prediction results as the result of the color reproducibility of the entire image.

6. A non-transitory recording medium having recorded therein a program so as to be readable by a machine, the program causing a computer to function as the image information processing apparatus according to claim 1.

* * * * *